(12) United States Patent
Yanai et al.

(10) Patent No.: US 7,563,492 B2
(45) Date of Patent: Jul. 21, 2009

(54) LIQUID CRYSTAL COMPOSITION AND LIQUID CRYSTAL DISPLAY DEVICE

(75) Inventors: Motoki Yanai, Chiba (JP); Hiroaki Kawashukuda, Chiba (JP); Shuichi Goto, Chiba (JP); Yasuhiro Kubo, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 96 days.

(21) Appl. No.: 11/598,633

(22) Filed: Nov. 14, 2006

(65) Prior Publication Data

US 2007/0108409 A1 May 17, 2007

(30) Foreign Application Priority Data

Nov. 16, 2005 (JP) ............................. 2005-331238

(51) Int. Cl.
C09K 19/34 (2006.01)
C09K 19/30 (2006.01)
C09K 19/12 (2006.01)

(52) U.S. Cl. .............. 428/1.3; 252/299.61; 252/299.63; 252/299.66; 252/299.5

(58) Field of Classification Search .................. 428/1.1, 428/1.3; 252/299.01, 299.61, 299.63, 299.66, 252/299.5
See application file for complete search history.

(56) References Cited

U.S. PATENT DOCUMENTS

| 4,581,155 A | 4/1986 | Goto et al. | ............. 252/299.61 |
| 5,250,220 A | 10/1993 | Wachtler et al. | |
| 6,326,065 B1 * | 12/2001 | Haseba et al. | ................. 428/1.1 |

FOREIGN PATENT DOCUMENTS

| CA | 2040423 | | 3/1991 |
| CA | 2042603 | A1 | 4/1991 |
| EP | 0 122 389 | A2 | 10/1984 |
| EP | 0 123 907 | A2 | 11/1984 |
| EP | 0 132 377 | A2 | 1/1985 |
| EP | 0 334 911 | B1 | 10/1989 |
| EP | 0 411 511 | A2 | 2/1991 |
| EP | 0 717 093 | A2 | 6/1996 |
| EP | 0 949 232 | A1 | 10/1999 |
| JP | 57165328 | | 10/1982 |
| JP | 63-196685 | | 8/1988 |
| JP | 2-86689 | A | 3/1990 |
| JP | 4-299308 | | 10/1992 |
| JP | 1 006 109 | A1 | 6/2000 |
| WO | WO 98/06677 | | 7/1989 |

OTHER PUBLICATIONS

European Search Report dated Mar. 8, 2007 corresponding to European Application No. EP 06 25 5827.

* cited by examiner

Primary Examiner—Shean C Wu
(74) Attorney, Agent, or Firm—Hogan & Hartson LLP

(57) ABSTRACT

A liquid crystal composition having a nematic phase that includes three components, wherein the first component is at least one compound selected from the group of compounds represented by formula (1), the second component is at least one compound selected from the group of compounds represented by formulas (2-1) to (2-3), and the third component is at least one compound selected from the group of compounds represented by formula (3):

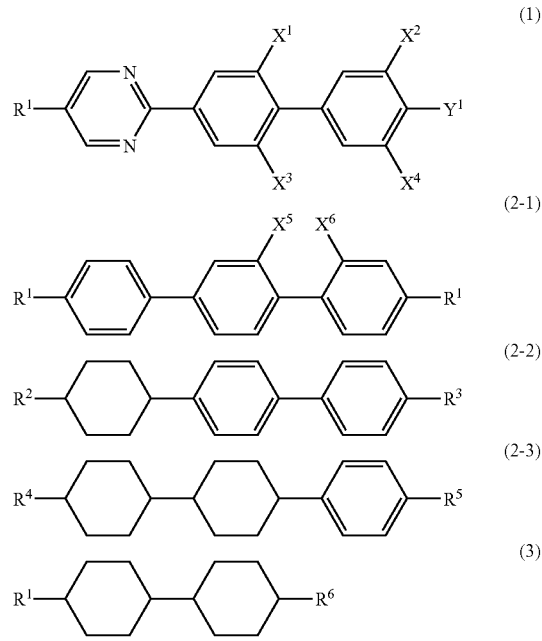

wherein $R^1$, $R^2$ and $R^4$ are each independently alkyl having 1 to 12 carbons or alkenyl having 2 to 12 carbons; $R^3$ is fluorine, alkyl having 1 to 12 carbons or alkenyl having 2 to 12 carbons; $R^5$ is fluorine, chlorine, alkyl having 1 to 12 carbons or alkenyl having 2 to 12 carbons; $R^6$ is alkenyl having 2 to 12 carbons; $Y^1$ is fluorine, chlorine or trifluoromethoxy; $X^1$, $X^2$, $X^3$ and $X^4$ are each independently hydrogen or fluorine; and one of $X^5$ and $X^6$ is fluorine, and the other is hydrogen.

14 Claims, No Drawings

LIQUID CRYSTAL COMPOSITION AND LIQUID CRYSTAL DISPLAY DEVICE

CROSS REFERENCE TO RELATED APPLICATIONS

This application claims priority under 35 U.S.C. §119 to Japanese Patent Application No. JP 2005-331238, filed Nov. 16, 2005, which is expressly incorporated herein by reference in its entirety.

BACKGROUND OF THE INVENTION

1. Field of the Invention

The invention relates to a liquid crystal composition suitable for use in an active matrix (AM) device, and an AM device containing the composition.

2. Related Art

In a liquid crystal display device, classification based on an operating mode of liquid crystals includes phase change (PC), twisted nematic (TN), super twisted nematic (STN), electrically controlled birefringence (ECB), optically compensated bend (OCB), in-plane switching (IPS), vertical alignment (VA), and so forth. Classification based on a driving mode includes a passive matrix (PM) and an active matrix (AM). PM is further classified into static, multiplex and so forth, and AM is classified into a thin film transistor (TFT), a metal insular metal (MIM) and so forth. TFT is further classified into amorphous silicon and polycrystal silicon. The latter is classified into a high temperature type and a low temperature type according to a production process. Classification based on a light source includes a reflection type utilizing a natural light, a transmission type utilizing a backlight and a semi-transmission type utilizing both the natural light and the backlight.

These devices contain a liquid crystal composition having suitable characteristics. The liquid crystal composition has a nematic phase. General characteristics of the composition should be improved to obtain an AM device having good general characteristics. Table 1 below summarizes the relationship between the general characteristics of the two. The general characteristics of the composition will be explained further based on a commercially available AM device. A temperature range of a nematic phase relates to the temperature range in which the device can be used. A desirable maximum temperature of the nematic phase is approximately 70° C. or more and a desirable minimum temperature is approximately −10° C. or less. The viscosity of the composition relates to the response time of the device. A short response time is desirable for displaying a moving image. Accordingly, a small viscosity of the composition is desirable. A small viscosity at a low temperature is more desirable.

TABLE 1

General Characteristics of a Liquid Crystal Composition and an AM Device

| No | General Characteristics of a Composition | General Characteristics of an AM Device |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Dielectric anisotropy is positively or negatively large | Driving voltage is low and electric power consumption is small |
| 5 | Specific resistance is large | Voltage holding ratio is large and a contrast ratio is large |
| 6 | It is stable to ultraviolet light and heat | Service life is long |

[1] A liquid crystal composition can be injected into a cell in a short time.

The optical anisotropy of the composition relates to the contrast ratio of the device. A product (Δn·d) of the optical anisotropy (Δn) of the composition and the cell gap (d) of the device is designed to maximize the contrast ratio. A suitable value of the product depends on the kind of operation mode. In a device having a TN mode and so forth, a suitable value is approximately 0.45 μm. In this case, a composition having a large optical anisotropy is desirable for a device having a small cell gap. A large dielectric anisotropy of the composition contributes to a low threshold voltage, a small electric power consumption and a large contrast ratio. In general, the viscosity is large when the dielectric anisotropy is large. Suitable dielectric anisotropy is demanded depending on the purposes of devices. A large specific resistance of the device contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after it has been used for a long time. A stability of the composition to an ultraviolet light and heat relates to a service life of the liquid crystal display device. In the case where the stability is high, the device has a long service life.

Conventional compositions are disclosed in the following patent documents. JP S59-216876 A/1984 (U.S. Pat. No. 4,581,155), JP S63-196685 A/1988, JP H2-502921 A/1990, JP H2-501311 A/1990, JP H2-86689 A/1990, JP H3-63621 A/1991, JP H4-502781 A/1992, JP H4-501272 A/1992, JP H4-501575 A/1992, JP H4-299308 A/1992 and JP H8-157826 A/1996 (EP 0717093 A2).

A desirable AM device has characteristics that the usable temperature range is wide, that the response time is short, that the contrast ratio is large, the threshold voltage is low, the voltage holding ratio is large, the service life is long, and so forth. Even a one millisecond shorter response time is desirable. Thus, the composition having characteristics such as a high maximum temperature of a nematic phase, a low minimum temperature of a nematic phase, a small viscosity, a large optical anisotropy, a large dielectric anisotropy, a large specific resistance, a high stability to an ultraviolet light, a high stability to heat, and so forth is especially desirable.

SUMMARY OF THE INVENTION

The invention concerns a liquid crystal composition having a nematic phase that includes first, second and third components, wherein the first component is at least one compound selected from the group of compounds represented by formula (1), the second component is at least one compound selected from the group of compounds represented by formulas (2-1) to (2-3), and the third component is at least one compound selected from the group of compounds represented by formula (3):

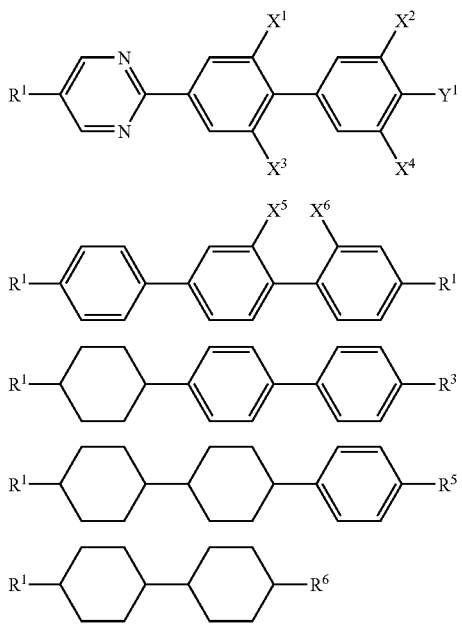

wherein $R^1$, $R^2$ and $R^4$ are each independently alkyl having 1 to 12 carbons or alkenyl having 2 to 12 carbons; $R^3$ is fluorine, alkyl having 1 to 12 carbons or alkenyl having 2 to 12 carbons; $R^5$ is fluorine, chlorine, alkyl having 1 to 12 carbons or alkenyl having 2 to 12 carbons; $R^6$ is alkenyl having 2 to 12 carbons; $Y^1$ is fluorine, chlorine or trifluoromethoxy; $X^1$, $X^2$, $X^3$ and $X^4$ are each independently hydrogen or fluorine; and one of $X^5$ and $X^6$ is fluorine, and the other is hydrogen.

The invention also concerns a liquid crystal display device that includes the liquid crystal composition, and so forth.

DETAILED DESCRIPTION OF THE INVENTION

Reference will now be made in detail to the preferred embodiments of the invention. This invention may, however, be embodied in many different forms and should not be construed as limited to the embodiments set forth herein. In addition and as will be appreciated by one of skill in the art, the invention may be embodied as a method, system or process.

The terms used in the specification and claims are defined as follows. The liquid crystal composition of the invention or the liquid crystal display device of the invention may occasionally be expressed simply as "the composition" or "the device," respectively. A liquid crystal display device is a generic term for a liquid crystal display panel and a liquid crystal display module. The "liquid crystal compound" is a generic term for a compound having a liquid crystal phase such as a nematic phase, a smectic phase and so forth, and also for a compound having no liquid crystal phase but being useful as a component of a composition. The useful compound contains a 6-membered ring such as 1,4-cyclohexylene and 1,4-phenylene, and a linear molecular structure. An optically active compound may occasionally be added to the composition. Even in the case where the compound is a liquid crystal compound, the compound is classified into an additive. At least one compound selected from a group of compounds represented by formula (1) may be abbreviated to "the compound (1)." The group of compounds represented by formula (1) may also be abbreviated to "the compound (1)." The other formulas are applied with the same rules.

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also at a high temperature in the initial stage, the composition has a large specific resistance at room temperature and also at a high temperature even after it has been used for a long time. "A voltage holding ratio is large" means that a device has a large voltage holding ratio at room temperature and also at a high temperature in the initial stage, the device has a large voltage holding ratio at room temperature and also at a high temperature even after it has been used for a long time. In the description of the characteristics such as optical anisotropy, the characteristics of the composition such as the optical anisotropy and so forth are values measured in the methods disclosed in Examples. "A ratio of the first component" means the percentage by weight (% by weight) based on the total weight of liquid crystal composition. A ratio of the second component and so forth are applied with the same rule. A ratio of an additive mixed with the composition means the percentage by weight (% by weight) based on the total weight of liquid crystal composition.

The following compound (1) has a large optical anisotropy, a large dielectric anisotropy and a small viscosity.

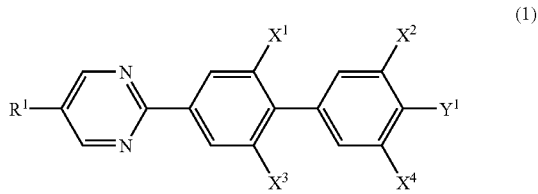

wherein $R^1$ is alkyl having 1 to 12 carbons or alkenyl having 2 to 12 carbons; $Y^1$ is fluorine, chlorine or trifluoromethoxy; and $X^1$, $X^2$, $X^3$ and $X^4$ are each independently hydrogen or fluorine. The compound is suitable as a component of a composition for a device for high-speed response. The compound has been used as a compound for PM and STN along with a cyano compound or a tolan compound. On the other hand, a cyano compound and a tolan compound do not satisfy high reliability required in an AM device. Accordingly, upon expanding to a composition for an AM device, it is necessary to develop a composition by selecting another compound suitably. The compounds (2-1) to (2-3) and the compound (3) are selected to satisfy high reliability and balance among various characteristics to complete the composition. The compounds (2-1) to (2-3) have a wide nematic phase and can control optical anisotropy suitably, and the compound (3) has a small viscosity and a low minimum temperature. A composition is prepared based on the findings to complete a composition that has a suitable optical anisotropy, a suitable dielectric anisotropy, a small viscosity, high reliability, a high maximum temperature, a low minimum temperature and so forth. The invention further includes a component compound that is capable of finely controlling the characteristics of the composition.

The inventions has the following features:

1. A liquid crystal composition having a nematic phase that includes first, second and third components, wherein the first component is at least one compound selected from the group of compounds represented by formula (1), the second component is at least one compound selected from the group of compounds represented by formulas (2-1) to (2-3), and the third component is at least one compound selected from the group of compounds represented by formula (3):

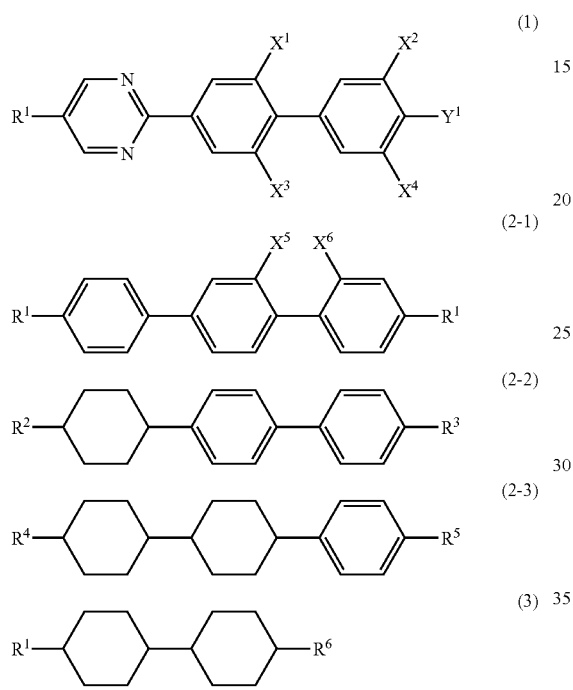

wherein $R^1$, $R^2$ and $R^4$ are each independently alkyl having 1 to 12 carbons or alkenyl having 2 to 12 carbons; $R^3$ is fluorine, alkyl having 1 to 12 carbons or alkenyl having 2 to 12 carbons; $R^5$ is fluorine, chlorine, alkyl having 1 to 12 carbons or alkenyl having 2 to 12 carbons; $R^6$ is alkenyl having 2 to 12 carbons; $Y^1$ is fluorine, chlorine or trifluoromethoxy; $X^1$, $X^2$, $X^3$ and $X^4$ are each independently hydrogen or fluorine; and one of $X^5$ and $X^6$ is fluorine, and the other is hydrogen.

2. The liquid crystal composition according to item 1, wherein the ratio of the first component is in a range of from approximately 5% to approximately 40% by weight, the ratio of the second component is in a range of from approximately 5% to approximately 60% by weight, and the ratio of the third component is in a range of from approximately 10% to approximately 55% by weight, based on the total weight of the liquid crystal composition.

3. A liquid crystal composition having a nematic phase that includes first, second and third components, wherein the first component is at least one compound selected from the group of compounds represented by formula (1), the second component is at least one compound selected from the group of compounds represented by formulas (2-1) to (2-3), and the third component is at least one compound selected from the group of compounds represented by formulas (3-1) and (3-2):

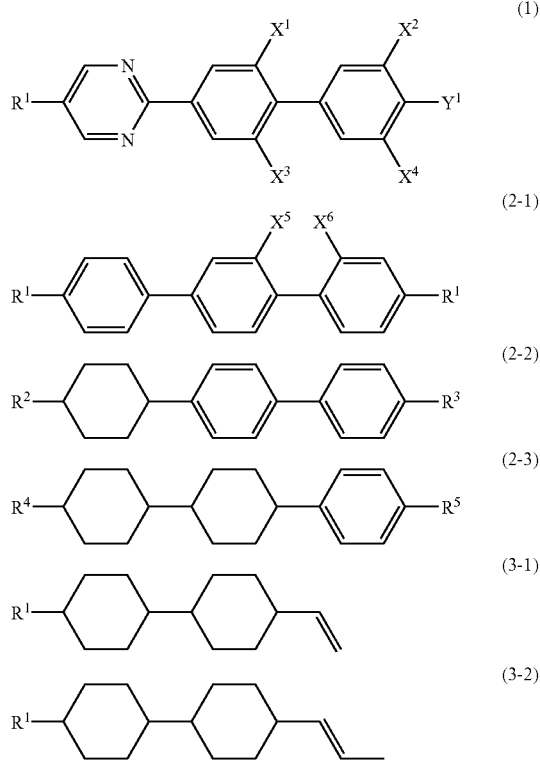

wherein $R^1$ and $R^2$ are alkyl having 1 to 12 carbons; $R^3$ is fluorine; $R^4$ is alkyl having 1 to 12 carbons or alkenyl having 2 to 12 carbons; $R^5$ is fluorine, chlorine, alkyl having 1 to 12 carbons or alkenyl having 2 to 12 carbons; $Y^1$ is fluorine, chlorine or trifluoromethoxy; $X^1$, $X^2$, $X^3$ and $X^4$ are each independently hydrogen or fluorine; $X^5$ is fluorine; and $X^6$ is hydrogen.

4. A liquid crystal composition having a nematic phase that includes first, second and third components, wherein the first component is at least one compound selected from the group of compounds represented by formulas (1-1) to (1-4), the second component is at least one compound selected from the group of compounds represented by formulas (2-1) to (2-3), and the third component is at least one compound selected from the group of compounds represented by formula (3):

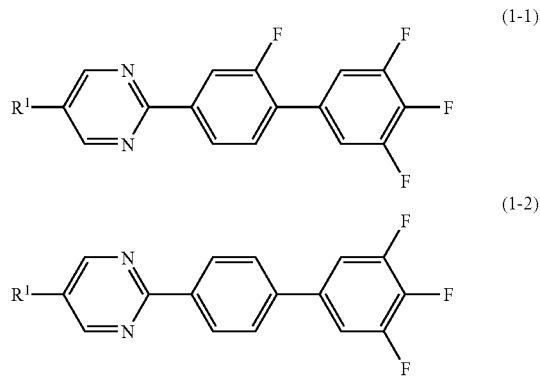

-continued

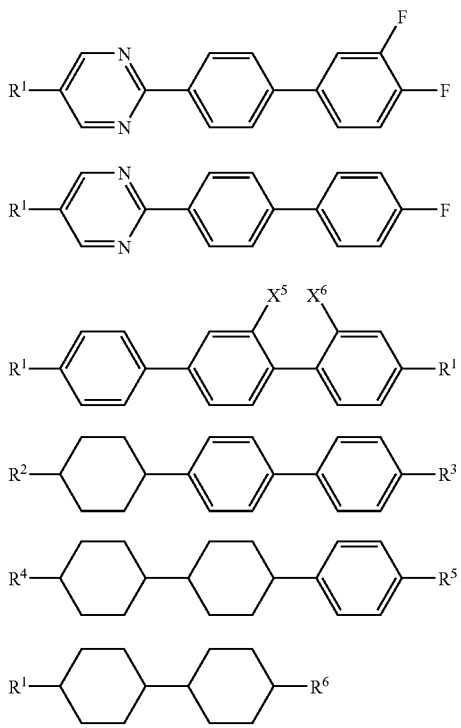

wherein $R^1$, $R^2$ and $R^4$ are each independently alkyl having 1 to 12 carbons or alkenyl having 2 to 12 carbons; $R^3$ is fluorine, alkyl having 1 to 12 carbons or alkenyl having 2 to 12 carbons; $R^5$ is fluorine, chlorine, alkyl having 1 to 12 carbons or alkenyl having 2 to 12 carbons; $R^6$ is alkenyl having 2 to 12 carbons; and one of $X^5$ and $X^6$ is fluorine, and the other is hydrogen.

5. A liquid crystal composition having a nematic phase that includes first, second and third components, wherein the first component is at least one compound selected from the group of compounds represented by formulas (1-1) to (1-4), the second component is at least one compound selected from the group of compounds represented by formulas (2-1) to (2-3), and the third component is at least one compound selected from the group of compounds represented by formulas (3-1) and (3-2):

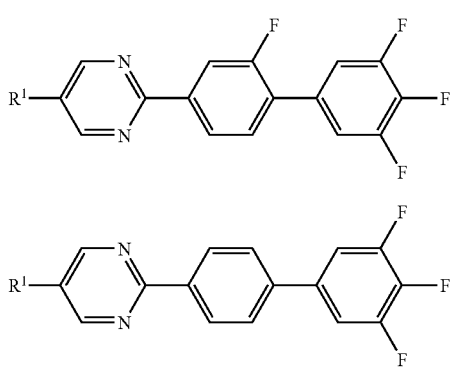

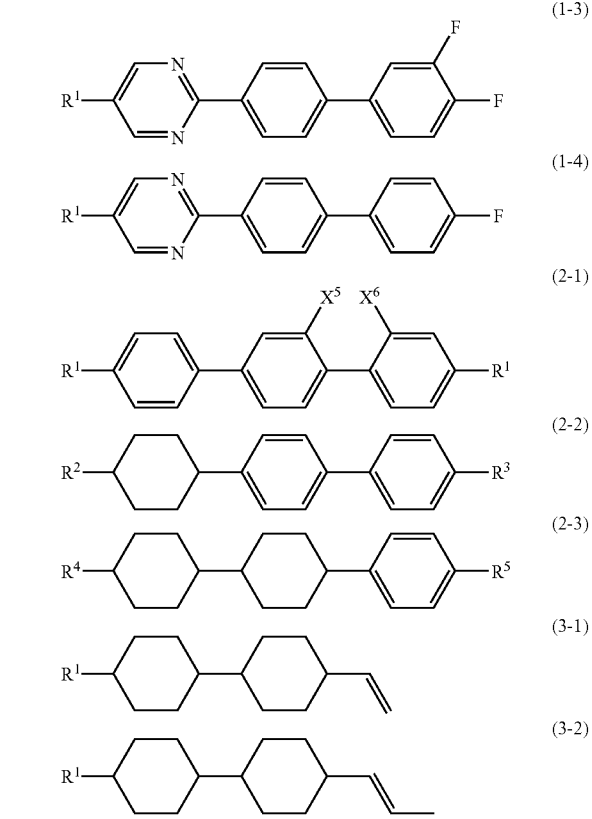

wherein $R^1$ and $R^2$ are alkyl having 1 to 12 carbons; $R^3$ is fluorine; $R^4$ is alkyl having 1 to 12 carbons or alkenyl having 2 to 12 carbons; $R^5$ is fluorine, chlorine, alkyl having 1 to 12 carbons or alkenyl having 2 to 12 carbons; $X^5$ is fluorine; and $X^6$ is hydrogen.

6. The liquid crystal composition according to any one of items 4 and 5, wherein the first component is at least one compound selected from the group of compounds represented by formula (1-1), and the second component is at least one compound selected from the group of compounds represented by formula (2-1) and at least one compound selected from the group of compounds represented by formula (2-2).

7. The liquid crystal composition according to any one of items 4 and 5, wherein the first component is at least one compound selected from the group of compounds represented by formula (1-1), and the second component is at least one compound selected from the group of compounds represented by formula (2-1) and at least one compound selected from the group of compounds represented by formula (2-3).

8. The liquid crystal composition according to any one of items 4 and 5, wherein the first component is at least one compound selected from the group of compounds represented by formula (1-1), and the second component is at least one compound selected from the group of compounds represented by formula (2-2) and at least one compound selected from the group of compounds represented by formula (2-3).

9. The liquid crystal composition according to any one of items 4 and 5, wherein the first component is at least one compound selected from the group of compounds represented by formula (1-1), and the second component is at least one compound selected from the group of compounds represented by formula (2-1), at least one compound selected from the group of compounds represented by formula (2-2), and at least one compound selected from the group of compounds represented by formula (2-3).

10. The liquid crystal composition according to any one of items 4 and 5, wherein the first component is at least one compound selected from the group of compounds represented by formula (1-1) and at least one compound selected from the group of compounds represented by formula (1-4), and the second component is at least one compound selected from the group of compounds represented by formula (2-1) and at least one compound selected from the group of compounds represented by formula (2-2).

11. The liquid crystal composition according to any one of items 4 and 5, wherein the first component is at least one compound selected from the group of compounds represented by formula (1-1) and at least one compound selected from the group of compounds represented by formula (1-4), and the second component is at least one compound selected from the group of compounds represented by formula (2-1) and at least one compound selected from the group of compounds represented by formula (2-3).

12. The liquid crystal composition according to any one of items 4 and 5, wherein the first component is at least one compound selected from the group of compounds represented by formula (1-1) and at least one compound selected from the group of compounds represented by formula (1-4), and the second component is at least one compound selected from the group of compounds represented by formula (2-2) and at least one compound selected from the group of compounds represented by formula (2-3).

13. The liquid crystal composition according to any one of items 4 and 5, wherein the first component is at least one compound selected from the group of compounds represented by formula (1-1) and at least one compound selected from the group of compounds represented by formula (1-4), and the second component is at least one compound selected from the group of compounds represented by formula (2-1), at least one compound selected from the group of compounds represented by formula (2-2), and at least one compound selected from the group of compounds represented by formula (2-3).

14. The liquid crystal composition according to any one of items 4 and 5, wherein the first component is at least one compound selected from the group of compounds represented by formula (1-3), and the second component is at least one compound selected from the group of compounds represented by formula (2-1) and at least one compound selected from the group of compounds represented by formula (2-2).

15. The liquid crystal composition according to any one of items 4 and 5, wherein the first component is at least one compound selected from the group of compounds represented by formula (1-3), and the second component is at least one compound selected from the group of compounds represented by formula (2-1) and at least one compound selected from the group of compounds represented by formula (2-3).

16. The liquid crystal composition according to any one of items 4 and 5, wherein the first component is at least one compound selected from the group of compounds represented by formula (1-3), and the second component is at least one compound selected from the group of compounds represented by formula (2-2) and at least one compound selected from the group of compounds represented by formula (2-3).

17. The liquid crystal composition according to any one of items 4 and 5, wherein the first component is at least one compound selected from the group of compounds represented by formula (1-3) and at least one compound selected from the group of compounds represented by formula (1-4), and the second component is at least one compound selected from the group of compounds represented by formula (2-1) and at least one compound selected from the group of compounds represented by formula (2-2).

18. The liquid crystal composition according to any one of items 4 and 5, wherein the first component is at least one compound selected from the group of compounds represented by formula (1-3) and at least one compound selected from the group of compounds represented by formula (1-4), and the second component is at least one compound selected from the group of compounds represented by formula (2-1) and at least one compound selected from the group of compounds represented by formula (2-3).

19. The liquid crystal composition according to any one of items 4 and 5, wherein the first component is at least one compound selected from the group of compounds represented by formula (1-3) and at least one compound selected from the group of compounds represented by formula (1-4), and the second component is at least one compound selected from the group of compounds represented by formula (2-2) and at least one compound selected from the group of compounds represented by formula (2-3).

20. The liquid crystal composition according to any one of items 4 and 5, wherein the first component is at least one compound selected from the group of compounds represented by formula (1-4), and the second component is at least one compound selected from the group of compounds represented by formula (2-1) and at least one compound selected from the group of compounds represented by formula (2-2).

21. The liquid crystal composition according to any one of items 4 and 5, wherein the first component is at least one compound selected from the group of compounds represented by formula (1-4), and the second component is at least one compound selected from the group of compounds represented by formula (2-1) and at least one compound selected from the group of compounds represented by formula (2-3).

22. The liquid crystal composition according to any one of items 4 and 5, wherein the first component is at least one compound selected from the group of compounds represented by formula (1-4), and the second component is at least one compound selected from the group of compounds represented by formula (2-2) and at least one compound selected from the group of compounds represented by formula (2-3).

23. The liquid crystal composition according to any one of items 4 and 5, wherein the first component is at least one compound selected from the group of compounds represented by formula (1-4), and the second component is at least one compound selected from the group of compounds represented by formula (2-1), at least one compound selected from the group of compounds represented by formula (2-2), and at least one compound selected from the group of compounds represented by formula (2-3).

24. The liquid crystal composition according to any one of items 4 to 23, wherein the ratio of the first component is in a range of from approximately 5% to approximately 40% by weight, the ratio of the second component is in a range of from approximately 5% to approximately 60% by weight, and the ratio of the third component is in a range of from approximately 10% to approximately 55% by weight, based on the total weight of the liquid crystal composition.

25. The liquid crystal composition according to any one of items 1 to 24, wherein the composition further includes at least one compound selected from the group of compounds having a group represented by formulas (4-1) and (4-2) as a fourth component:

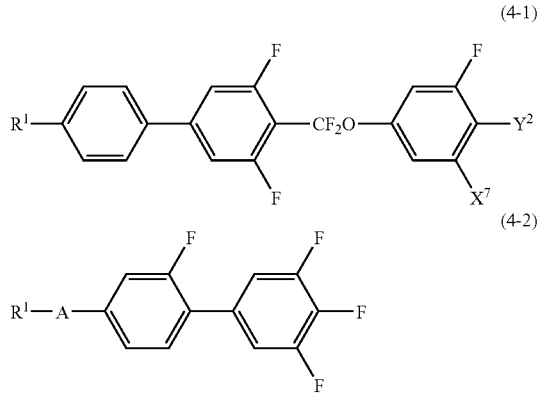

wherein $R^1$ is alkyl having 1 to 12 carbons or alkenyl having 2 to 12 carbons; $Y^2$ is fluorine or trifluoromethoxy; $X^7$ is hydrogen or fluorine; and A is 1,4-cyclohexylene or 1,4-phenylene.

26. The liquid crystal composition according to item 25, wherein the fourth component is at least one compound selected from the group of compounds represented by formula (4-1).

27. The liquid crystal composition according to any one of items 25 and 26, wherein the ratio of the first component is in a range of from approximately 5% to approximately 40% by weight, the ratio of the second component is in a range of from approximately 5% to approximately 60% by weight, the ratio of the third component is in a range of from approximately 10% to approximately 55% by weight, and the ratio of the fourth component is in a range of from approximately 10% to approximately 35% by weight, based on the total weight of the liquid crystal composition.

28. The liquid crystal composition according to any one of items 1 to 27, wherein the composition further includes at least one compound selected from the group of compounds having a group represented by formulas (5-1) and (5-2) as a fifth component:

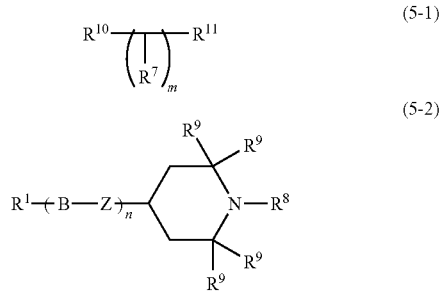

wherein $R^1$ is alkyl having 1 to 12 carbons or alkenyl having 2 to 12 carbons; $R^7$ is hydrogen or group D,

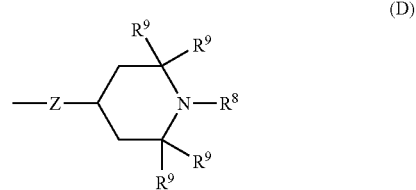

wherein at least one of $R^7$ is group D; $R^8$ is hydrogen, alkyl having 1 to 12 carbons or alkoxy having 1 to 12 carbons; $R^9$ is alkyl having 1 to 8 carbons; $R^{10}$ and $R^{11}$ are each independently hydrogen or alkyl having 1 to 5 carbons; B is 1,4-cyclohexylene, 1,4-phenylene or 3-fluoro-1,4-phenylene; Z is a single bond, ethylene, carbonyloxy or oxycarbonyl; m is an integer of 1 to 20; and n is 1 or 2.

29. The liquid crystal composition according to item 28, wherein a ratio of the first component is in the range of from approximately 5% to approximately 40% by weight, the ratio of the second component is in a range of from approximately 5% to approximately 60% by weight, the ratio of the third component is in a range of from approximately 10% to approximately 55% by weight, the ratio of the fourth component is in a range of from approximately 10% to approximately 35% by weight, and the ratio of the fifth component is in a range of from approximately 0.001% to approximately 5% by weight, based on the total weight of the liquid crystal composition.

30. The liquid crystal composition according to any one of items 1 and 29, wherein the maximum temperature of a nematic phase is approximately 70° C. or more, the optical anisotropy (25° C.) at a wavelength of 589 nm is in the range of from approximately 0.11 to approximately 0.17, and the rotation viscosity (25° C.) is in the range of from approximately 20 mPa·s to approximately 60 mPa·s.

31. A liquid crystal display device that includes the liquid crystal composition according to any one of items 1 to 30.

The invention further includes: (1) the composition described above, wherein the composition further contains an optically active compound; (2) the composition described above, wherein the composition further contains an additive other than the fifth component, such as an antioxidant, an ultraviolet light absorbent and a defoaming agent; (3) an AM device containing the composition described above; (4) a device having a TN, ECB, OCB or IPS, containing the composition described above; (5) a device of a transmission type, containing the composition described above; (6) use of the composition described above as a composition having a nematic phase; and (7) use as an optically active composition by adding an optically active compound to the composition described above.

One of the advantages of the invention is to provide a liquid crystal composition that satisfies many characteristics among the characteristics such as a high maximum temperature of a nematic phase, a low minimum temperature of a nematic phase, a small viscosity, a suitable optical anisotropy, a suitable dielectric anisotropy, a large specific resistance, a high stability to ultraviolet light and a high stability to heat. Another of the advantages of the invention is to provide a liquid crystal composition that is properly balanced regarding many characteristics. Another of the advantages of the invention is to provide a liquid crystal display device that contains the liquid crystal composition. One aspect of the invention is to provide a liquid crystal composition that has a small viscosity, an optical anisotropy of from approximately 0.09 to approximately 0.17 and so forth, and that provides an AM device that has a short response time, a large voltage holding ratio, a large contrast ratio, a long service life and so forth.

The composition of the invention will be explained in the following order. First, the constitution of component compounds in the composition will be explained. Second, the main characteristics of the component compounds and the main effects of the compounds on the composition will be explained. Third, a desirable ratio of the component compounds and the basis thereof will be explained. Fourth, a desirable embodiment of the component compounds will be explained. Fifth, examples of the component compound will be shown. Sixth, the preparation methods of the component compound will be explained. Seventh, additives that may be added to the composition will be explained. Lastly, use of the composition will be explained.

First, the constitution of component compounds in the composition will be explained. The composition of the invention is classified into the composition A and the composition B. The composition A may further contain a liquid crystal compound, an additive, an impurity, and so forth. This liquid crystal compound is different from the compound (1), the compound (2-1), the compound (2-2), the compound (2-3), the compound (3), the compound (3-1), the compound (3-2), the compound (4-1), the compound (4-2), the compound (5-1) and the compound (5-2). Such a compound is mixed with the composition for the purpose of adjusting the characteristics of the composition. The additive includes an optically active compound, a coloring matter, an antioxidant, an ultraviolet light absorbent, and so forth. The impurity is a compound and so forth contaminated in the process such as the synthesis of a component compound and so forth.

The composition B is selected from the compound (1), the compound (2-1), the compound (2-2), the compound (2-3), the compound (3), the compound (3-1), the compound (3-2), the compound (4-1), the compound (4-2), the compound (5-1) and the compound (5-2). Thus, the composition B does not contain a liquid crystal compound which is different from these compounds, but may further contain the additive, the impurity, and so forth. The components of the composition B is fewer than those of the composition A. The composition B is preferable to the composition A from the viewpoint of costs. The composition A is preferable to the composition B because characteristics of the composition A can be further adjusted by mixing with other liquid crystal compounds.

Second, the main characteristics of the component compounds and the main effects of the compounds on the composition will be explained. The main characteristics of the component compounds other than the fifth component are summarized in Table 2. In Table 2, the symbol "L" represents large or high, the symbol "M" represents a middle degree, and the symbol "S" represents small or low.

The main effects of the component compounds on the characteristics of the composition upon mixing the component compounds to the composition are as follows. The compound (1) increases the dielectric anisotropy and increases the optical anisotropy. The compounds (2-1) to (2-3) increase the maximum temperature, decrease the minimum temperature, decrease the viscosity and control the optical anisotropy to a suitable value. The compound (3) particularly decreases the viscosity of the composition. The compounds (4-1) and (4-2) particularly increase the dielectric anisotropy of the composition. The compounds (5-1) and (5-2) particularly increase the stability to ultraviolet light of the composition.

Third, desirable ratios of the component compounds and the basis therefor will be explained. A desirable ratio of the first component is approximately 5% by weight or more for increasing the dielectric anisotropy and increasing the optical anisotropy, and is approximately 40% by weight or less for decreasing the minimum temperature. A desirable ratio is from approximately 5% to approximately 30%. A more desirable ratio is from approximately 10% to approximately 25%.

A desirable ratio of the second component is approximately 5% by weight or more for increasing the maximum temperature, decreasing the minimum temperature, and decreasing the viscosity, and is approximately 60% by weight or less for decreasing the minimum temperature. A desirable ratio is from approximately 10% to approximately 55%. A more desirable ratio is from approximately 10% to approximately 50%.

A desirable ratio of the third component is approximately 10% by weight or more for decreasing the viscosity, and is approximately 55% by weight or less for decreasing the minimum temperature and increasing the dielectric anisotropy. A desirable ratio is from approximately 10% to approximately 50%. A more desirable ratio is from approximately 15% to approximately 40%.

The fourth component is an optional component, and is suitable for preparing a composition having a particularly large dielectric anisotropy. A desirable ratio of the fourth component is approximately 35% by weight or less for decreasing the minimum temperature. A more desirable ratio is approximately 30% or less.

The fifth component may be added for obtaining a high stability to ultraviolet light. A desirable ratio of the fifth component is approximately 0.001% by weight of more for exhibiting further stability to ultraviolet light, and is approximately 5% by weight or less for increasing the maximum temperature and decreasing the minimum temperature. A desirable ratio is from approximately 0.001% to approximately 2%. A more desirable ratio is from approximately 0.01% to approximately 2%.

In the composition A described above, a desirable total ratio of the first component, the second component, the third component and the fourth component is approximately 70%

TABLE 2

| | Characteristics of Compounds | | | | | | |
| --- | --- | --- | --- | --- | --- | --- | --- |
| | Compound (1) | Compound (2-1) | Compound (2-2) | Compound (2-3) | Compound (3) | Compound (4-1) | Compound (4-2) |
| Maximum Temperature | M-L | L | L | L | S | S | S |
| Viscosity | M-L | M | M | M | S | L | L |
| Optical Anisotropy | L | L | M | M | S | M | M |
| Dielectric Anisotropy | L | M | M | M | S | L | L |
| Specific Resistance | L | L | L | L | L | L | L | by weight or more for obtaining good characteristics. A more desirable total ratio is approximately 90% by weight or more. In the composition B described above, a total ratio of the four components is 100%.

Fourth, a desirable embodiment of the component compound will be explained.

$R^1$, $R^2$ and $R^4$ are each independently alkyl having 1 to 12 carbons or alkenyl having 2 to 12 carbons. Desirable $R^1$ and $R^2$ each are alkyl having 1 to 12 carbons. $R^3$ is fluorine, alkyl having 1 to 12 carbons or alkenyl having 2 to 12 carbons, and $R^5$ is fluorine, chlorine, alkyl having 1 to 12 carbons or alkenyl having 2 to 12 carbons. Desirable $R^1$ to $R^5$ each are linear alkyl having 1 to 7 carbons or linear alkenyl having 2 to 7 carbons for increasing the maximum temperature and decreasing the minimum temperature. $R^6$ is alkenyl having 2 to 12 carbons. Desirable $R^6$ is linear alkenyl having 2 to 7 carbons for decreasing the viscosity. $R^8$ is alkyl having 1 to 12 carbons, alkoxy having 1 to 12 carbons or hydrogen. Desirable $R^8$ are hydrogen or methyl for further increasing the stability to ultraviolet light. Particularly desirable $R^8$ is hydrogen. $R^9$ is alkyl having 1 to 8 carbons. Desirable $R^9$ is linear alkyl having 1 to 5 carbons. Particularly desirable $R^9$ is methyl.

Desirable alkyl are methyl, ethyl, propyl, butyl, pentyl, hexyl, heptyl, or octyl. More desirable alkyl are ethyl, propyl, butyl, pentyl, or heptyl for decreasing a viscosity.

Desirable alkenyl are vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl are vinyl, 1-propenyl, 3-butenyl, or 3-pentenyl for decreasing a viscosity. A desirable configuration of —CH═CH— in these alkenyls depends on the position of a double bond. Trans is desirable in the alkenyl such as 1-propenyl, 1-butenyl, 1-pentenyl, 1-hexenyl, 3-pentenyl, and 3-hexenyl for decreasing a viscosity. Cis is desirable in the alkenyl such as 2-butenyl, 2-pentenyl and 2-hexenyl. In these alkenyls, linear alkenyl is preferable to branched alkenyl.

A is 1,4-cyclohexylene or 1,4-phenylene. Desirable A is 1,4-phenylene for increasing the dielectric anisotropy and increasing the optical anisotropy. On the configuration of 1,4-cyclohexylene, trans is preferable to cis for increasing the maximum temperature. B is 1,4-cyclohexylene, 1,4-phenylene, or 3-fluoro-1,4-phenylene. Desirable B is 1,4-phenylene for increasing the maximum temperature and decreasing the minimum temperature. On the configuration of 1,4-cyclohexylene, trans is preferable to cis for increasing the maximum temperature.

Z is a single bond, ethylene, carbonyloxy or oxycarbonyl. Desirable Z are carbonyloxy or oxycarbonyl for increasing a maximum temperature and decreasing a minimum temperature.

$X^1$ to $X^4$ are each independently hydrogen or fluorine. Desirable $X^1$ to $X^4$ of the compound (1) are combinations in this order of fluorine, fluorine, hydrogen and fluorine; hydrogen, fluorine, hydrogen and fluorine; hydrogen, fluorine, hydrogen and hydrogen; or hydrogen, hydrogen, hydrogen and hydrogen, for increasing a maximum temperature and decreasing a minimum temperature. More desirable $X^1$ to $X^4$ are combinations in this order of fluorine, fluorine, hydrogen and fluorine; hydrogen, fluorine, hydrogen and hydrogen; or hydrogen, hydrogen, hydrogen and hydrogen. Particularly desirable $X^1$ to $X^4$ are combinations in this order of fluorine, fluorine, hydrogen and fluorine; or hydrogen, hydrogen, hydrogen and hydrogen. $X^5$ and $X^6$ in the compound (2-1) are combinations in this order of fluorine and hydrogen; or hydrogen and fluorine. Desirable $X^5$ and $X^6$ in the compound (2-1) are a combination in this order of fluorine and hydrogen for increasing a maximum temperature and decreasing a minimum temperature. $X^7$ is hydrogen or fluorine.

$Y^1$ is fluorine, chlorine or trifluoromethoxy. Desirable $Y^1$ are fluorine or trifluoromethoxy for increasing the dielectric anisotropy, decreasing the viscosity and decreasing the minimum temperature. Particularly desirable $Y^1$ is fluorine. $Y^2$ is fluorine or trifluoromethoxy. Particularly desirable $Y^2$ is fluorine. "m" is an integer of 1 to 20. Desirable m is 2 or more, and at least two $R^7$ are group D, for further increasing the stability to ultraviolet light. More desirable m is 4 or more, and at least four $R^7$ are group D. "n" is 1 or 2.

Fifth, examples of the component compounds will be shown. In the desirable compounds described below, $R^1$ is linear alkyl having 1 to 10 carbons or linear alkenyl having 2 to 10 carbons. In these desirable compounds, trans is preferable to cis for the configuration of 1,4-cyclohexylene for increasing the maximum temperature. The symbol $R^1$ is used for many compounds in the chemical formulas for the component compounds. $R^1$ may be identical or different in these compounds. In one case, for example, $R^1$ of the compound (1) is ethyl and $R^1$ of the compound (2-1-1) is ethyl. In another case, $R^1$ of the compound (1) is ethyl and $R^1$ of the compound (2-1-1) is propyl. This rule is also applicable to the symbols $R^2$, $R^3$, and so forth.

Desirable compound (1) are the compounds (1-1) to (1-16). More desirable compound (1) are the compounds (1-1) to (1-4) for increasing the maximum temperature, decreasing the minimum temperature, increasing the dielectric anisotropy, and decreasing the viscosity. Particularly desirable compound (1) are the compounds (1-1), (1-3) and (1-4). Desirable compound (2-1) are the compounds (2-1-1) and (2-1-2). More desirable compound (2-1) is the compound (2-1-1) for decreasing the minimum temperature. Desirable compound (2-2) are the compounds (2-2-1) and (2-2-2). More desirable compound (2-2) is the compound (2-2-2) for decreasing the minimum temperature. Desirable compound (2-3) are the compounds (2-3-1) to (2-3-3). More desirable compound (2-3) are the compounds (2-3-1) and (2-3-3) for decreasing the minimum temperature. Particularly desirable compound (2-3) is the compound (2-3-1), wherein the left terminal group $R^1$ is alkenyl having 2 to 12 carbons. Desirable compound (3) are the compounds (3-1) to (3-6). More desirable compound (3) are the compounds (3-1) and (3-2) for increasing the maximum temperature, decreasing the minimum temperature, and decreasing the viscosity.

Desirable compound (4-1) are the compounds (4-1-1) to (4-1-4). More desirable compound (4-1) are the compounds (4-1-1) and (4-1-4) for increasing the dielectric anisotropy, decreasing the viscosity, and decreasing the minimum temperature. Desirable compound (4-2) are the compounds (4-2-1) and (4-2-2). More desirable compound (4-2) is the compound (4-2-1) for increasing the dielectric anisotropy, decreasing the viscosity, and decreasing the minimum temperature.

Desirable compound (5-1) are the compounds (5-1-1) to (5-1-5). More desirable compound (5-1) are the compounds (5-1-1) or (5-1-2) for increasing the stability to ultraviolet light. Particularly desirable compound (5-1) is the compound (5-1-1).

Desirable compound (5-2) are the compounds (5-2-1) to (5-2-16). More desirable compound (5-2) are the compounds (5-2-3) to (5-2-5) and (5-2-10) to (5-2-14) for increasing the stability to ultraviolet light.

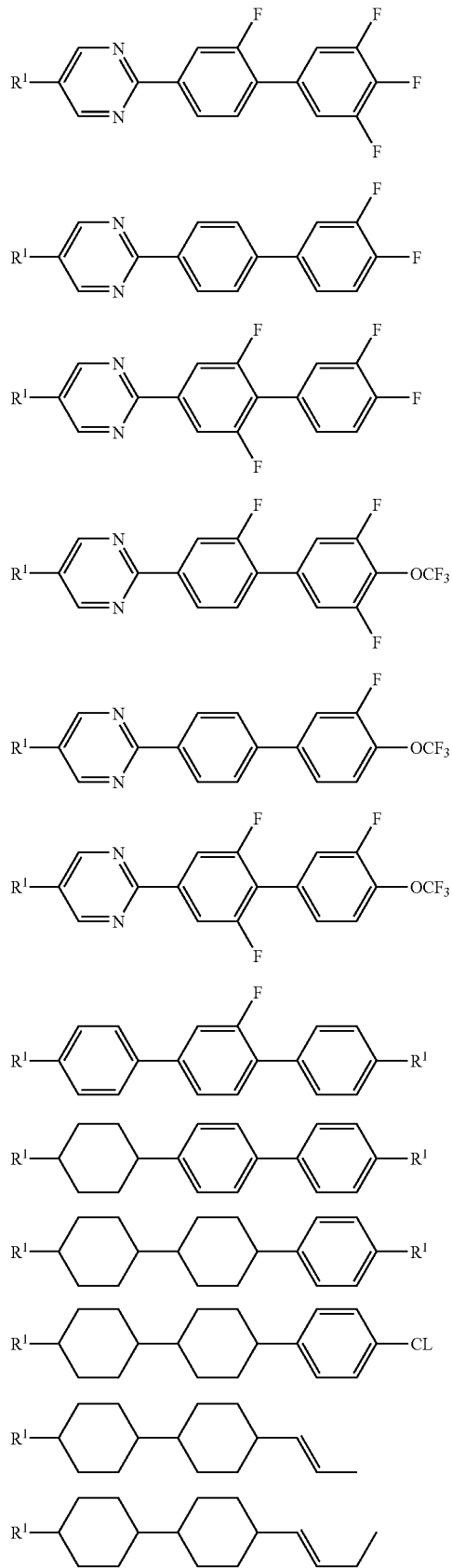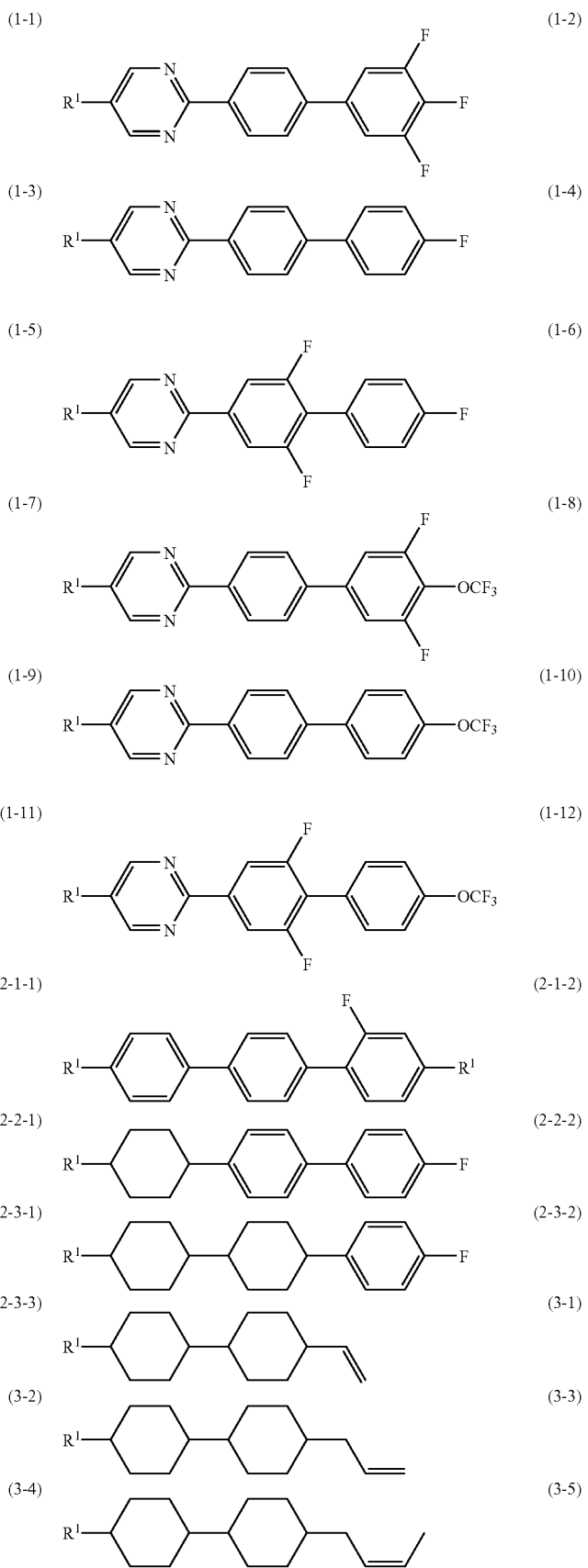

-continued
(3-6)
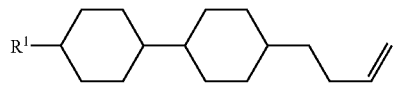
(4-1-1)
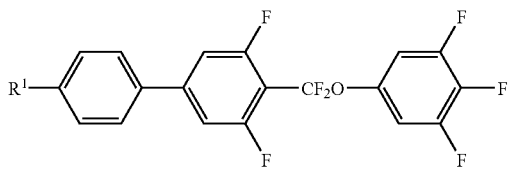
(4-1-2)
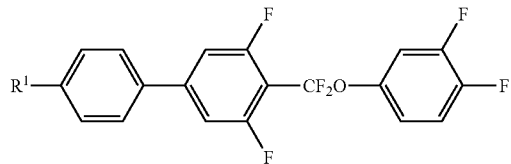
(4-1-3)
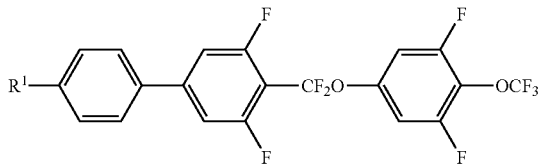
(4-1-4)
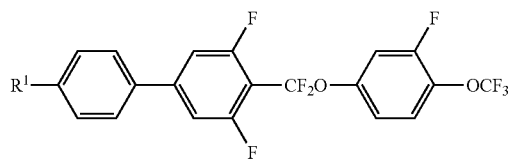
(4-2-1)
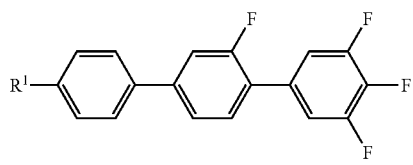
(4-2-2)
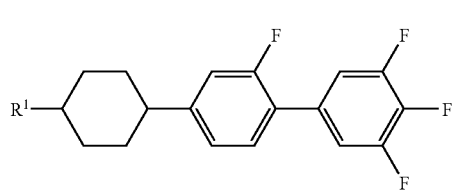
(5-1-1)
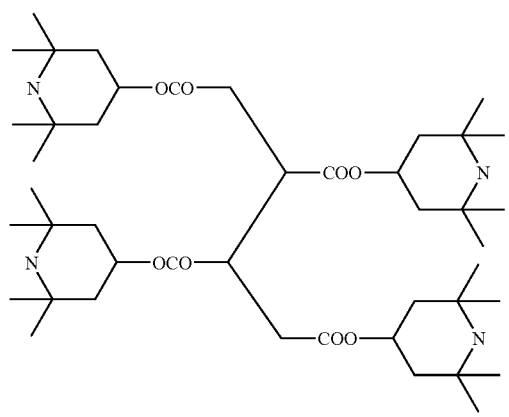
(5-1-2)
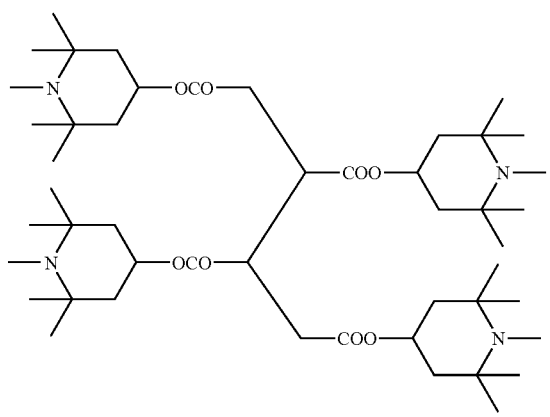
(5-1-3)
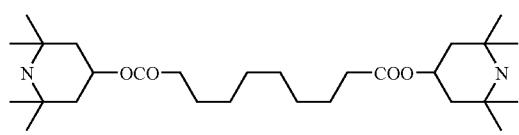
(5-1-4)
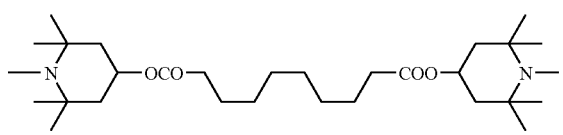
(5-1-5)
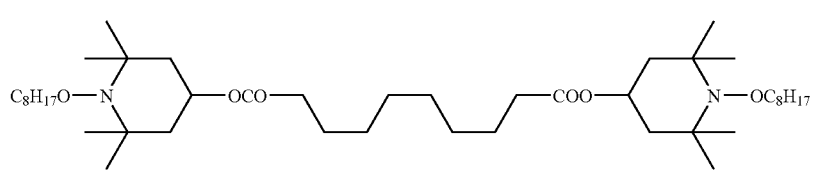

-continued
(5-2-1) 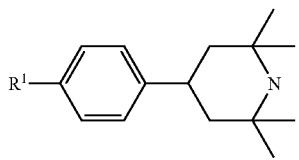
(5-2-2) 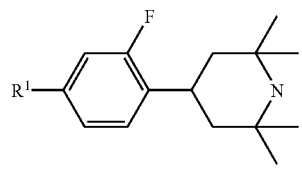
(5-2-3) 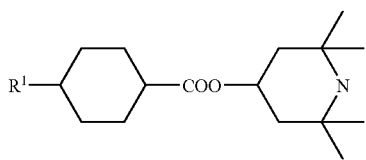
(5-2-4) 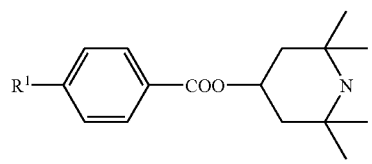
(5-2-5) 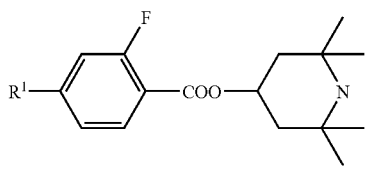
(5-2-6) 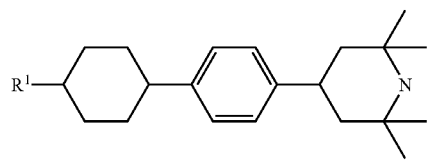
(5-2-7) 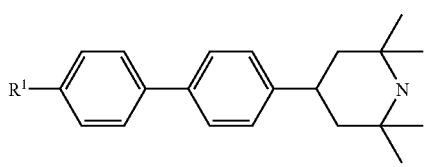
(5-2-8) 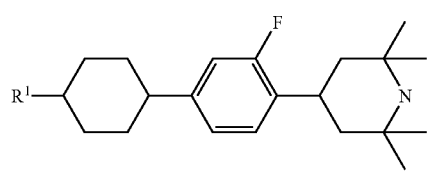
(5-2-9) 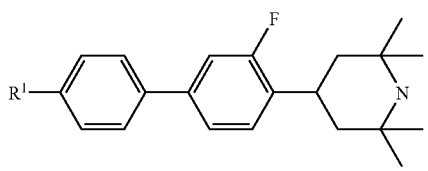
(5-2-10) 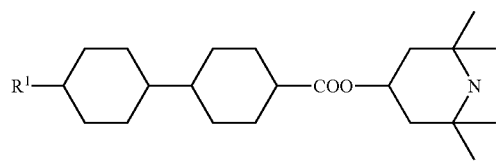
(5-2-11) 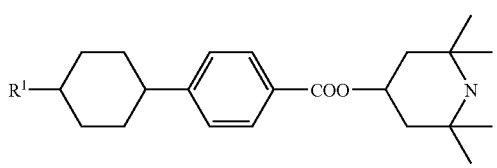
(5-2-12) 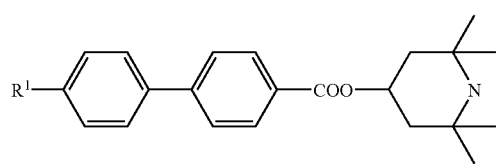
(5-2-13) 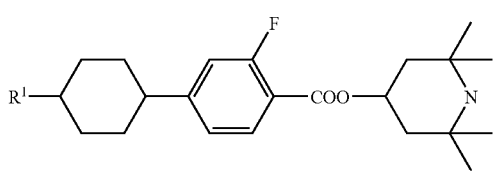
(5-2-14) 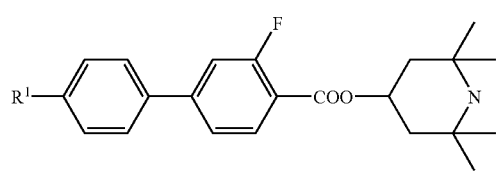
(5-2-15) 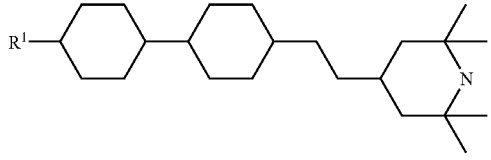
(5-2-16) 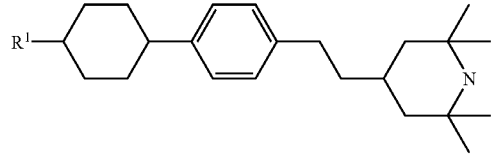

Sixth, the preparation methods of the component compounds will be explained. These compounds can be prepared by known methods. The preparation method will be exemplified below. The compound (1-4) is prepared by the method disclosed in JP S59-216876 A/1984. The compound (2-1-1) is prepared by the method disclosed in JP S60-51135 A1985. The compound (2-3-1) is prepared by the method disclosed in JP S57-165328 A/1982. The compound (2-3-2) is prepared by the method disclosed in JP S57-64626A/1982. The compound (2-3-3) is prepared by the method disclosed in JP S57-114531 A/1982. The compounds (3-1) to (3-6) are prepared by the method disclosed in JP H4-30382 B/1992. The compounds (4-1-1) to (4-1-4) are prepared by the method disclosed in JP H10-251186 A/1998. The compounds (5-1-1) and (5-1-2) are available from Asahi Denka Co., Ltd.

The compounds for which preparation methods are not described above can be prepared according to the methods described in ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth.

Seventh, additives capable of being mixed with the composition will be explained. The additive includes an optically active compound, a coloring matter, an antioxidant, an ultraviolet light absorbent, and so forth. An optically active compound is mixed in the composition for inducing a helical structure of liquid crystal in order to provide a twist angle. Examples of the optically active compound include the compounds (6-1) to (6-4) below. A desirable ratio of the optically active compound is approximately 5% or less, and a more desirable ratio thereof ranges from approximately 0.01% to approximately 2%.

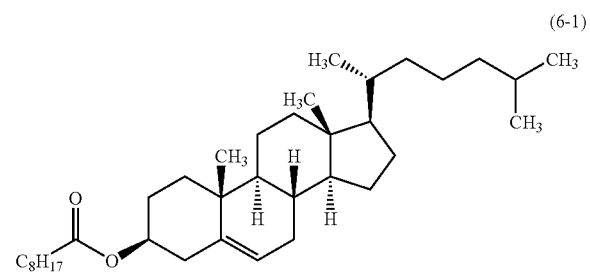

(6-1)

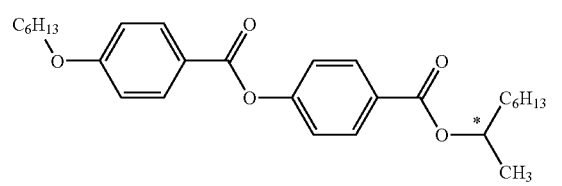

(6-2)

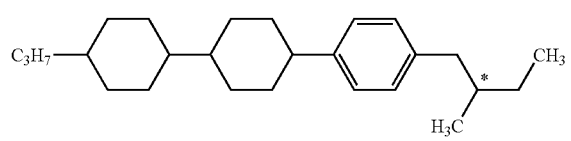

(6-3)

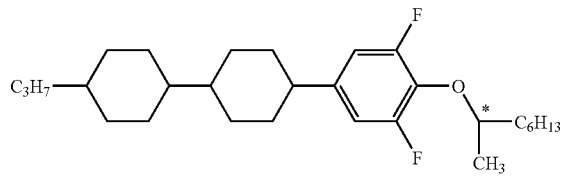

(6-4)

A dye is mixed with the composition to suit for a device of a guest host (GH) mode. A desirable ratio of the dye ranges from approximately 0.01% to approximately 10%. An antioxidant is mixed with the composition in order to avoid a decrease in specific resistance caused by heating in the air, or to maintain a large voltage holding ratio at room temperature and also at a high temperature even after the device has been used for a long time. A desirable ratio of the antioxidant is approximately 50 ppm or more for obtaining the advantage thereof and is approximately 600 ppm or less for preventing the maximum temperature from being decreased and preventing the minimum temperature from being increased. A more desirable ratio thereof ranges from approximately 100 ppm to approximately 300 ppm.

Preferred examples of the antioxidant include the compound (7)

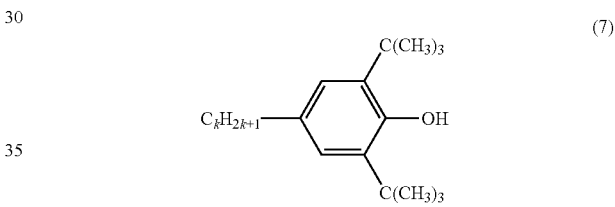

(7)

wherein k is an integer of from 1 to 9. In the compound (7), desirable k are 1, 3, 5, 7, or 9. More desirable k are 1 or 7. When k is 1, the compound (7) has a large volatility, and is effective in preventing the decrease of specific resistance caused by heating in the air. When k is 7, the compound (7) has a small volatility, and is effective in maintaining a large voltage holding ratio at room temperature and also at a high temperature even after the device has been used for a long time.

Preferred examples of the ultraviolet light absorbent include a benzophenone derivative, a benzoate derivative and a triazole derivative. A desirable ratio of the ultraviolet light absorbent is approximately 50 ppm or more for obtaining the advantage thereof and is approximately 10,000 ppm or less for preventing the maximum temperature from being decreased and preventing the minimum temperature from being increased. A more desirable ratio thereof ranges from approximately 100 ppm to approximately 1,000 ppm.

Lastly, use of the composition will be explained. Most of the compositions have a minimum temperature of approximately −10° C. or less, a maximum temperature of 70° C. or more, and an optical anisotropy of approximately 0.15 to approximately 0.25. The device containing the composition has a large voltage holding ratio. The composition is suitable for an AM device. The composition is suitable especially for an AM device of a transmission type. The composition having an optical anisotropy of approximately 0.15 to approximately 0.25 and further the composition having an optical anisotropy of approximately 0.12 to approximately 0.30 may be prepared by controlling ratios of the component compounds or by mixing other liquid crystal compounds. The composition can be used as a composition having a nematic phase and as an optically active composition by adding an optically active compound.

The composition can be used for an AM device. It can also be used for a PM device. The composition can also be used for a device having a mode such as PC, TN, STN, ECB, OCB, IPS, VA, and so forth. It is desirable to use the composition for a device having a mode of TN or OCB. These devices may be of a reflection type, a transmission type or a semi-transmission type. It is desirable to use the composition for a device of a transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three dimensional net-work polymer is formed in the composition, for example, a polymer network (PN) device.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be explained in detail by way of Examples. The invention is not limited by the Examples described below. The compounds described in the Comparative Examples and the Examples are expressed by the symbols according to the definitions in Table 3. In Table 3, the configuration of 1,4-cyclohexylene and 1,3-dioxane-2,5-diyl is trans. The configuration regarding a bonding group of —CH═CH— is trans. The parenthesized number next to the symbolized compounds in the Examples corresponds to the number of the desirable compound. The symbol (—) means other liquid crystal compound. A ratio (percentage) of a liquid crystal compound is percentage by weight (% by weight) based on the total weight of liquid crystal compounds. Lastly, the characteristics of the composition are summarized.

TABLE 3

Method of Description of Compound using Symbols
R-(A1)-Z1-....-Zn-(An)-R'

| 1) left Terminal Group R- | Symbol |
|---|---|
| $C_nH_{2n+1}$— | n- |
| $C_nH_{2n+1}O$— | nO- |
| $C_mH_{2m+1}OC_nH_{2n}$— | mOn- |
| $CH_2$═CH— | V- |
| $CH_3$—CH═CH—$(CH_3)_2$— | 1V2- |
| $CH_3$—CCH═CH— | 1V- |
| $CF_2$═CH— | VFF- |
| $CF_2$═CH—$(CH_3)_7$— | VFF2- |

| 2) Right Terminal Group -R' | Symbol |
|---|---|
| —$C_nH_{2n+1}$ | -n |
| —$OC_nH_{2n+1}$ | -On |
| —F | -F |
| —Cl | -CL |

TABLE 3-continued

Method of Description of Compound using Symbols
R-(A1)-Z1-....-Zn-(An)-R'

| | |
|---|---|
| —$OCF_3$ | —OCF3 |
| —$OCF_2CFHCF_3$ | —OCF2CFHCF3 |

| 3) Bonding Group -Zn- | Symbol |
|---|---|
| —$C_2H_4$— | 2 |
| —COO— | E |
| —CH═CH— | V |
| —C≡C— | T |
| —$CF_2O$— | X |

| 4) Ring structure -An- | Symbol |
|---|---|
| 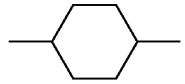 | H |
| 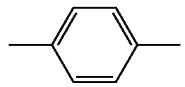 | B |
| 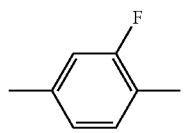 | B(F) |
| 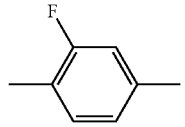 | B(2F) |
| 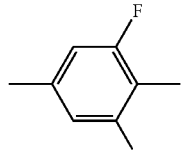 | B(F,F) |
| 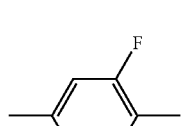 | B(2F,5F) |
| 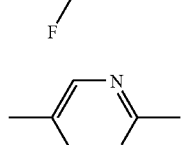 | Py |

5) Example of Description

Example 1    3-PyB(F)B(F,F)-F

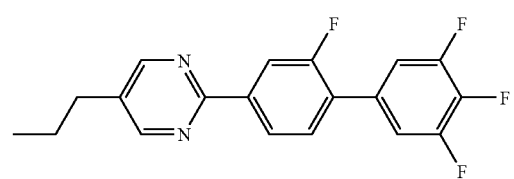

TABLE 3-continued

Method of Description of Compound using Symbols
R-(A1)-Z1-....-Zn-(An)-R'

Example 2   V-HH-3

Example 3   2-BBB(2F)-3

Example 4   1V2-BB(F,F)XB(F)-OCF3

The composition is prepared by first measuring components such as a liquid crystal compound and then by mixing them. Thus, it is easy to calculate the percentage by weight of the component. However, it is not easy to calculate exactly the ratios of the components by analyzing the composition with gas chromatography because the correction coefficient depends on the kind of a liquid crystal compound. Fortunately, the correction coefficient is approximately 1. Furthermore, the difference of approximately 1% by weight only slightly influences on characteristics of the composition. Therefore, the peak area ratio of the component peaks in the gas chromatograph can be regarded as a percentage by weight of the component compound. Namely, the results of gas chromatographic analysis (peak area ratio) are considered to be equivalent to the percentage by weight of a liquid crystal compound without correction.

When a sample was a composition, it was measured as it was, and the obtained value is described here. When a sample was a compound, a sample for measurement was prepared by mixing 15% by weight of the compound and 85% by weight of mother liquid crystals. A value of characteristic of the compound was calculated by extrapolating from a value obtained by measurement. Namely: extrapolated value= (value measured−0.85×value measured for mother liquid crystals)/0.15. When a smectic phase (or crystals) separated out at this ratio at 25° C., a ratio of the compound and mother liquid crystals was changed step by step in the order of (10% by weight/90% by weight), (5% by weight/95% by weight), (1% by weight/99% by weight), respectively. Values for a maximum temperature, optical anisotropy, viscosity, and dielectric anisotropy of the compound were obtained by the extrapolation.

The composition of the mother liquid crystals is as shown below.

$C_3H_7$— —CN   24%

$C_5H_{11}$— —CN   36%

$C_7H_{15}$— —CN   25%

$C_5H_{11}$— —CN   15%

Measurement of the characteristics was carried out according to the following methods. Most methods are described in the Standard of Electric Industries Association of Japan, EIAJ ED-2521 A or those with some modifications. A TFT was not attached to a TN device used for measurement.

Maximum Temperature of a Nematic Phase (NI; ° C.): A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

Minimum Temperature of a Nematic Phase (Tc; ° C.): A sample having a nematic phase was put in a glass vial and then kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals or a smectic phase at −30° C., Tc was expressed as ≦−20° C. A lower limit of a temperature range of a nematic phase may be abbreviated to "a minimum temperature."

Viscosity (η; mPa·s, measured at 20° C.): Viscosity was measured by means of an E-type viscometer.

Rotation Viscosity (γ1; measured at 25° C.; mPa·s): Rotation viscosity was measured according to the method disclosed in M. Imai, et al., *Molecular Crystals and Liquid Crystals*, vol. 259, p. 37 (1995). A sample was placed in a TN device, in which a twist angle was 0°, and a cell gap between two glass plates was 5 μm. The TN device was impressed with a voltage in a range of from 16 V to 19.5 V stepwise by 0.5 V. After a period of 0.2 second with no impress of voltage, voltage impress was repeated with only one rectangular wave (rectangular pulse of 0.2 second) and application of no voltage (2 seconds). A peak current and a peak time of a transient current generated by the voltage impress were measured. Rotation viscosity was obtained from the measured values and the calculating equation (8) in the literature by M. Imai, et al., p. 40. As the dielectric anisotropy necessary for the calculation, the value measured by the measuring method of dielectric anisotropy described below with the device for measuring the rotation viscosity was used.

Optical Anisotropy (Δn; measured at 25° C.): Measurement was carried out with an Abbe refractometer mounting a polarizing plate on an ocular using a light at a wavelength of 589 nm. The surface of a main prism was rubbed in one direction, and then a sample was dropped on the main prism. Refractive index n∥ was measured when the direction of a polarized light was parallel to that of the rubbing. Refractive index n⊥ was measured when the direction of a polarized light was perpendicular to that of the rubbing. A value of optical anisotropy was calculated from the equation; $\Delta n = n\| - n\perp$.

Dielectric Anisotropy (Δ∈; measured at 25° C.): A sample having a nematic phase was put in a TN device having a distance between two glass substrates (cell gap) of 9 μm and a twist angle of 80°. Sine waves (10 V, 1 kHz) were impressed onto the device, and a dielectric constant (∈∥) in a major axis direction of a liquid crystal molecule was measured after 2 seconds. Sine waves (0.5 V, 1 kHz) were impressed onto the device, and a dielectric constant (∈⊥) in a minor axis direction of a liquid crystal molecule was measured after 2 seconds. A value of a dielectric anisotropy was calculated from the equation; $\Delta\in = \in\| - \in\perp$.

Threshold Voltage (Vth; measured at 25° C.; V): Measurement was carried out with an LCD Evaluation System Model LCD-5100 made by Otsuka Electronics Co., Ltd. The light source was a halogen lamp. A sample was poured into a TN device of a normally white mode, in which a cell gap between two glass plates was about 0.45/Δn (μm), and a twist angle was 80°. Voltage to be impressed onto the device (32 Hz, rectangular waves) was stepwise increased by 0.02 volt starting from 0 V up to 10 V. During the stepwise increasing, the device was irradiated with light in a perpendicular direction, and an amount of the light passing through the device was measured. A voltage-transmission curve was prepared, in which a maximum amount of a light corresponded to 100% transmittance, a minimum amount of a light corresponded to 0% transmittance. The threshold voltage is a value at 90% transmittance.

Voltage Holding Ratio (VHR-1; measured at 25° C.; %, VHR-2; measured at 80° C.; %): A TN device used for measurement has a polyimide-alignment film and the cell gap between two glass plates is 5 μm. A sample was poured into the device, and then the device was sealed with an adhesive which is polymerized by the irradiation of an ultraviolet light. The TN device was impressed and charged with pulse voltage (60 microseconds at 5 V). Decreasing voltage was measured for 16.7 milliseconds with a High Speed Voltmeter and the area A between a voltage curve and a horizontal axis in a unit cycle was obtained. The area B was an area without decreasing. The voltage holding ratio is a percentage of the area A to the area B.

Voltage Holding Ratio (VHR-3; measured at 25° C.; %): A voltage holding ratio (VHR-3; measured at 25° C.; %) was measured after irradiating with ultraviolet light to evaluate stability to ultraviolet light. A composition having large VHR-3 has a large stability to ultraviolet light. A TN device used for measurement has a polyimide-alignment film and the cell gap is 5 μm. A sample was poured into the device, and then the device was irradiated with light for 20 minutes. The light source was a superhigh voltage mercury lamp USH-500D (produced by Ushio, Inc.), and the distance between the device and the light source is 20 cm. In measurement of VHR-3, a decreasing voltage is measured for 1,667 milliseconds.

Response Time (τ; measured at 25° C.; ms (millisecond)): Measurement was carried out with an LCD Evaluation System Model LCD-5100 made by Otsuka Electronics Co., Ltd. The light source was a halogen lamp and the low-pass filter was set at 5 kHz. A sample was poured into a TN device of a normally white mode, in which a cell gap between two glass plates was about 0.45/Δn (μm), and a twist angle was 80°. Rectangle waves (60 Hz, 5 V, 0.5 seconds) were impressed to the device. During impressing, the device was irradiated with light in a perpendicular direction, and an amount of the light passing through the device was measured. A maximum amount of a light corresponds to 100% transmittance, and a minimum amount of a light corresponds to 0% transmission. Rise time (τr) was a period of time required for the change in transmittance from 90% to 10%. Fall time (τf) was a period of time required for the change in transmittance from 10% to 90%. Response time was the sum of the rise time and the fall time obtained.

Gas Chromatographic Analysis: A Gas Chromatograph Model GC-14B made by Shimadzu was used for measurements. The carrier gas was helium (2 milliliters per minute) and the evaporator and a detector (FID) were set up at 280° C. and 300° C., respectively. A capillary column DB-1 (length 30 meters, bore 0.32 millimeters, film thickness 0.25 micrometers, dimethylpolysiloxane as stationary phase, no polarity) made by Agilent Technologies, Inc. was used for the separation of the component compound. After the column had been kept at 200° C. for 2 minutes, it was further heated to 280° C. at the rate of 5° C. per minute. A sample was prepared in an acetone solution (0.1% by weight), and 1 microliter of the solution was injected into the evaporator. The recorder used was Chromatopac Model C-R5A made by Shimadzu or its equivalent. The gas chromatogram obtained showed a retention time of a peak and a peak area corresponding to the component compound.

Solvents for diluting the sample may also be chloroform, hexane, and so forth. The following capillary columns may also be used: HP-1 made by Agilent Technologies Inc. (length 30 meters, bore 0.32 millimeters, film thickness 0.25 micrometers), Rtx-1 made by Restek Corporation (length 30 meters, bore 0.32 millimeters, film thickness 0.25 micrometers), and BP-1 made by SGE International Pty. Ltd. (length 30 meters, bore 0.32 millimeters, film thickness 0.25 micrometers). In order to prevent compound peaks from overlapping, a capillary column CBP1-M50-025 (50 meters, bore 0.25 millimeters, film thickness 0.25 micrometers) made by Shimadzu Corporation may be used. An area ratio of each peak in the gas chromatogram corresponds to a ratio of the component compound. Percentage by weight of the component compound is not completely identical to an area ratio of each peak. According to the invention, however, percentage by weight of the component compound may be regarded to be identical to an area ratio of each peak, when these capillary columns are used because there is no significant difference in correction efficient of component compounds.

Comparative Example 1

Example 1 was chosen from the compositions disclosed in JP H2-502921 A/1990 because the composition contains the compound (1-3) and the compound (2-2-1) of the invention. The components and characteristics of the composition are as follows.

| 7-PyBB(F)—F | (1-3) | 2% |
|---|---|---|
| 5-HBB-9 | (2-2-1) | 5% |
| 5-HB-3 | (-) | 11% |
| 3-HB—O1 | (-) | 9% |
| 3-HB—O3 | (-) | 7% |
| 3-PyB-2 | (-) | 7% |
| 3-PyB-3 | (-) | 7% |
| 6-PyB—O4 | (-) | 5% |
| 6-PyB—O6 | (-) | 5% |
| 6-PyB—O8 | (-) | 5% |
| 7-PyB—O6 | (-) | 5% |
| 7-PyB—O8 | (-) | 5% |

-continued

| | | |
|---|---|---|
| 3-HH2B-1 | (-) | 9% |
| 3-HH2B-3 | (-) | 9% |
| 3-HH2B-5 | (-) | 9% |

NI=60.3° C.; Tc≦0° C.; Δn=0.127; Δ∈=0.7; γ1=65.2 mPa·s; Vth=4.19 V; VHR-1=97.2%; VHR-2=96.5%; τ=7.2 ms.

Comparative Example 2

Example 11 was chosen from the compositions disclosed in JP H8-157826 A/1996 because the composition contains the compound (1-4). The components and characteristics of the composition are as follows.

| | | |
|---|---|---|
| 3-PyBB—F | (1-4) | 5% |
| 4-PyBB—F | (1-4) | 5% |
| 5-PyBB—F | (1-4) | 4% |
| 2-HHB(F)—F | (-) | 4% |
| 3-HHB(F)—F | (-) | 4% |
| 5-HHB(F)—F | (-) | 4% |
| 4-HH—VFF | (-) | 6% |
| 5-HH—VFF | (-) | 7% |
| 2-BEB—CN | (-) | 5% |
| 3-HB—CN | (-) | 10% |
| 1O1-HB—CN | (-) | 6% |
| 3-HEB—O4 | (-) | 6% |
| 5-HEB—O1 | (-) | 6% |
| 4-HEB-3 | (-) | 6% |
| 4-HEB-4 | (-) | 6% |
| 3-HHEB(F,F)—F | (-) | 4% |
| 3-HHEB—F | (-) | 4% |
| 3-HBEB(F,F)—F | (-) | 4% |
| 3-HBEB—F | (-) | 4% |

NI=81.5° C.; Tc≦-20° C.; Δn=0.113; Δ∈=8.1; γ1=107.9 mPa·s; Vth=1.51 V; VHR-1=94.5%; VHR-2=65.2%; τ=13.4 ms.

Example 1

The composition of Example 1 has high NI, large Δ∈, low Vth, small γ1 and short τ, as compared to the composition of Comparative Example 1.

| | | |
|---|---|---|
| 3-PyBB—F | (1-4) | 10% |
| 4-PyBB—F | (1-4) | 9% |
| 5-PyBB—F | (1-4) | 10% |
| V—HHB-1 | (2-3-1) | 5% |
| V—HH-3 | (3-1) | 32% |
| 3-HB—CL | (-) | 14% |
| 3-HHB(F,F)—F | (-) | 5% |
| 3-HBB(F,F)—F | (-) | 15% |

NI=80.0° C.; Tc≦-10° C.; Δn=0.132; Δ∈=5.4; γ1=47.9 mPa·s; Vth=2.06 V; VHR-1=98.9%; VHR-2=98.0%; τ=5.3 ms.

Example 2

The composition of Example 2 has substantially equivalent NI, small γ1 and high VHR-2, as compared to the composition of Comparative Example 2.

| | | |
|---|---|---|
| 3-PyB(F)B(F,F)—F | (1-1) | 7% |
| 5-PyB(F)B(F,F)—F | (1-1) | 6% |
| 2-BB(F)B-3 | (2-1-1) | 8% |
| 2-BB(F)B-5 | (2-1-1) | 4% |
| 3-BB(F)B-5 | (2-1-1) | 2% |
| 2-HBB—F | (2-2-2) | 3% |
| 3-HBB—F | (2-2-2) | 3% |
| 5-HBB—F | (2-2-2) | 3% |
| V—HHB-1 | (2-3-1) | 11% |
| V—HH-3 | (3-1) | 51% |
| 3-HHBB(F,F)—F | (-) | 2% |

NI=79.1° C.; Tc≦-20° C.; Δn=0.113; Δ∈=3.4; γ1=40.1 mPa·s; Vth=2.25 V; VHR-1=99.0%; VHR-2=98.0%; τ=6.6 ms.

Example 3

| | | |
|---|---|---|
| 3-PyBB—F | (1-4) | 5% |
| 4-PyBB—F | (1-4) | 5% |
| 5-PyBB—F | (1-4) | 5% |
| 2-BB(F)B-3 | (2-1-1) | 5% |
| V—HHB-1 | (2-3-1) | 9% |
| 3-HHB—CL | (2-3-3) | 7% |
| V—HH-3 | (3-1) | 32% |
| 3-BB(F,F)XB(F,F)—OCF3 | (4-1-3) | 10% |
| 3-HB—CL | (-) | 14% |
| 3-HHB(F,F)—F | (-) | 5% |
| 3-HBB(F,F)—F | (-) | 3% |

NI=72.1° C.; Tc≦-20° C.; Δn=0.116; Δ∈=4.7; γ1=43.3 mPa·s; Vth=1.85 V; VHR-1=98.7%; VHR-2=98.1%; VHR-3=72.1%; τ=6.3 ms.

Example 4

| | | |
|---|---|---|
| 3-PyBB(F)—F | (1-3) | 7% |
| 5-PyBB(F)—F | (1-3) | 8% |
| 2-BB(F)B-3 | (2-1-1) | 5% |
| V—HHB-1 | (2-3-1) | 7% |
| 3-HHB—CL | (2-3-3) | 7% |
| V—HH-3 | (3-1) | 32% |
| 3-HB—CL | (-) | 14% |
| 3-HHB(F,F)—F | (-) | 5% |
| 3-HBB(F,F)—F | (-) | 15% |

NI=73.1° C.; Tc≦-20° C.; Δn=0.114; Δ∈=4.5; γ1=45.6 mPa·s; Vth=1.92 V; VHR-1=98.5%; VHR-2=97.9%; τ=6.6 ms.

Example 5

| | | |
|---|---|---|
| 3-PyBB(F,F)—F | (1-2) | 6% |
| 5-PyBB(F,F)—F | (1-2) | 6% |
| 2-BB(F)B-3 | (2-1-1) | 9.5% |
| V—HHB-1 | (2-3-1) | 8.5% |
| 3-HHB—CL | (2-3-3) | 7% |
| V—HH-3 | (3-1) | 29% |
| 3-HB—CL | (-) | 14% |
| 3-HHB(F,F)—F | (-) | 5% |
| 3-HBB(F,F)—F | (-) | 15% |

NI=71.9° C.; Tc≦-10° C.; Δn=0.114; Δ∈=4.7; γ1=46.9 mPa·s; Vth=1.89 V; VHR-1=98.0%; VHR-2=97.7%; VHR-3=79.4%; τ=7.1 ms.

Example 6

| | | |
|---|---|---|
| 3-PyBB(F,F)—F | (1-2) | 3% |
| 4-PyBB(F,F)—F | (1-2) | 4% |
| 5-PyBB(F,F)—F | (1-2) | 3% |
| V2-HBB-2 | (2-2-1) | 11% |
| 2-HBB—F | (2-2-2) | 5% |
| 3-HBB—F | (2-2-2) | 6% |
| 5-HBB—F | (2-2-2) | 6% |
| 3-HHB-1 | (2-3-1) | 5% |
| V—HHB-1 | (2-3-1) | 2% |
| V—HH-5 | (3-1) | 19% |
| 1V—HH-3 | (3-2) | 10% |
| 3-BB(F,F)XB(F,F)—F | (4-1-1) | 13% |
| 3-HB—CL | (-) | 13% |

NI=77.7° C.; Tc≦−10° C.; Δn=0.121; Δ∈=5.5; γ1=57.4 mPa·s; Vth=1.91 V; VHR-1=98.0%; VHR-2=97.5%; τ=7.1 ms.

Example 7

| | | |
|---|---|---|
| 2-PyB(F)B(F,F)—F | (1-1) | 6% |
| 3-PyB(F)B(F,F)—F | (1-1) | 6% |
| 4-PyB(F)B(F,F)—F | (1-1) | 3% |
| V2-PyB(F)B(F,F)—F | (1-1) | 3% |
| 2-BB(F)B-3 | (2-1-1) | 10% |
| 2-BBB(2F)-5 | (2-1-2) | 5% |
| V2-HBB-2 | (2-2-1) | 10% |
| 2-HBB—F | (2-2-2) | 5% |
| 3-HBB—F | (2-2-2) | 5% |
| 5-HBB—F | (2-2-2) | 5% |
| V—HH-3 | (3-1) | 25% |
| V—HH-4 | (3-1) | 10% |
| 3-HBB(F,F)—F | (-) | 7% |

NI=83.3° C.; Tc≦−20° C.; Δn=0.143; Δ∈=7.0; γ1=59.6 mPa·s; Vth=1.72 V; VHR-1=97.9%; VHR-2=97.5%; τ=6.2 ms.

Example 8

| | | |
|---|---|---|
| 2-PyB(F)B(F,F)—F | (1-1) | 5% |
| 3-PyB(F)B(F,F)—F | (1-1) | 5% |
| 5-PyB(F)B(F,F)—F | (1-1) | 5% |
| 2-BB(F)B-3 | (2-1-1) | 6% |
| 2-BB(F)B-5 | (2-1-1) | 6% |
| 3-HBB-2 | (2-2-1) | 5% |
| 5-HBB-2 | (2-2-1) | 5% |
| V2-HBB-2 | (2-2-1) | 10% |
| 1V-HBB-2 | (2-2-1) | 8% |
| V—HH-3 | (3-1) | 28% |
| V—HH-5 | (3-1) | 7% |
| 3-BB(F,F)XB(F,F)—F | (4-1-1) | 10% |

NI=87.0° C.; Tc≦−20° C.; Δn=0.143; Δ∈=7.6; γ1=60.1 mPa·s; Vth=1.68 V; VHR-1=98.0%; VHR-2=97.5%; τ=6.0 ms.

Example 9

| | | |
|---|---|---|
| 2-PyB(F)B(F,F)—F | (1-1) | 5% |
| 3-PyB(F)B(F,F)—F | (1-1) | 5% |
| 1V2-PyB(F)B(F,F)—F | (1-1) | 5% |
| 2-BB(F)B-3 | (2-1-1) | 10% |
| 2-BB(F)B-5 | (2-1-1) | 5% |
| 1V2-BB(F)B-5 | (2-1-1) | 5% |
| 2-BBB(2F)-5 | (2-1-2) | 8% |
| V—HHB-1 | (2-3-1) | 15% |
| V2-HHB-1 | (2-3-1) | 10% |
| 3-HHB—F | (2-3-2) | 5% |
| V—HH-3 | (3-1) | 22% |
| V—HH-4 | (3-1) | 5% |

NI=96.0° C.; Tc≦−20° C.; Δn=0.163; Δ∈=7.9; γ1=72.2 mPa·s; Vth=1.91 V; VHR-1=98.0%; VHR-2=97.5%; τ=7.7 ms.

Example 10

| | | |
|---|---|---|
| 2-PyB(F)B(F,F)—F | (1-1) | 9% |
| 3-PyB(F)B(F,F)—F | (1-1) | 9% |
| 5-PyB(F)B(F,F)—F | (1-1) | 9% |
| 2-BB(F)B-3 | (2-1-1) | 4% |
| 2-BB(F)B-5 | (2-1-1) | 8% |
| 3-BB(F)B-5 | (2-1-1) | 5% |
| 3-HHB-1 | (2-3-1) | 10% |
| 2-HHB—CL | (2-3-3) | 7% |
| 3-HHB—CL | (2-3-3) | 7% |
| 5-HHB—CL | (2-3-3) | 7% |
| V—HH-3 | (3-1) | 17% |
| 3-HB—CL | (-) | 8% |

NI=93.8° C.; Tc≦−10° C.; Δn=0.153; Δ∈=10.0; γ1=106.0 mPa·s; Vth=1.54 V; VHR-1=97.8%; VHR-2=97.4%; τ=10.0 ms.

Example 11

| | | |
|---|---|---|
| 2-PyB(F)B(F,F)—F | (1-1) | 5% |
| 3-PyB(F)B(F,F)—F | (1-1) | 5% |
| 5-PyB(F)B(F,F)—F | (1-1) | 5% |
| 3-HBB-2 | (2-2-1) | 4% |
| 4-HBB-2 | (2-2-1) | 4% |
| V2-HBB-2 | (2-2-1) | 5% |
| 2-HBB—F | (2-2-2) | 6% |
| 3-HBB—F | (2-2-2) | 6% |
| 5-HBB—F | (2-2-2) | 6% |
| 2-HHB-1 | (2-3-1) | 5% |
| 3-HHB-1 | (2-3-1) | 5% |
| V—HHB-1 | (2-3-1) | 10% |
| V2-HHB-1 | (2-3-1) | 8% |
| V—HH-3 | (3-1) | 20% |
| 1V—HH-3 | (3-1) | 6% |

NI=102.8° C.; Tc≦−20° C.; Δn=0.139; Δ∈=5.6; γ1=71.0 mPa·s; Vth=1.98 V; VHR-1=98.2%; VHR-2=97.7%; τ=7.3 ms.

Example 12

| | | |
|---|---|---|
| 2-PyB(F)B(F,F)—F | (1-1) | 6% |
| 3-PyB(F)B(F,F)—F | (1-1) | 6% |
| 5-PyB(F)B(F,F)—F | (1-1) | 6% |
| V2-HBB-2 | (2-2-1) | 10% |
| 2-HBB—F | (2-2-2) | 4% |
| 3-HBB—F | (2-2-2) | 4% |
| 5-HBB—F | (2-2-2) | 4% |
| 2-HHB—CL | (2-3-3) | 5% |
| 3-HHB—CL | (2-3-3) | 5% |
| 5-HHB—CL | (2-3-3) | 5% |
| V—HH-3 | (3-1) | 25% |
| 3-BB(F,F)XB(F,F)—F | (4-1-1) | 10% |
| 3-BB(F,F)XB(F)—OCF3 | (4-1-4) | 10% |

NI=79.2° C.; Tc≦−20° C.; Δn=0.134; Δ∈=10.9; γ1=91.0 mPa·s; Vth=1.41 V; VHR-1=97.6%; VHR-2=97.2%; τ=7.3 ms.

Example 13

| | | |
|---|---|---|
| 2-PyB(F)B(F,F)—F | (1-1) | 5% |
| 3-PyB(F)B(F,F)—F | (1-1) | 5% |
| 1V2-PyB(F)B(F,F)—F | (1-1) | 5% |
| 2-BB(F)B-3 | (2-1-1) | 10% |
| 2-HBB—F | (2-2-2) | 5% |
| 3-HBB—F | (2-2-2) | 5% |
| 5-HBB—F | (2-2-2) | 5% |
| 3-HHB-1 | (2-3-1) | 5% |
| V—HHB-1 | (2-3-1) | 15% |
| 3-HHB—F | (2-3-2) | 5% |
| V—HH-3 | (3-1) | 30% |
| 3-HB—CL | (-) | 5% |

NI=93.8° C.; Tc≦−20° C.; Δn=0.131; Δ∈=5.6; γ1=50.3 mPa·s; Vth=1.93 V; VHR-1=98.2%; VHR-2=97.9%; τ=5.4 ms.

Example 14

| | | |
|---|---|---|
| 2-PyB(F)B(F,F)—F | (1-1) | 5% |
| 3-PyB(F)B(F,F)—F | (1-1) | 5% |
| 2-BB(F)B-3 | (2-1-1) | 6% |
| 2-BBB(2F)-5 | (2-1-2) | 6% |
| 3-HBB-2 | (2-2-1) | 5% |
| V2-HBB-2 | (2-2-1) | 5% |
| V—HHB-1 | (2-3-1) | 10% |
| V2-HHB-1 | (2-3-1) | 5% |
| 2-HHB—CL | (2-3-3) | 3% |
| 3-HHB—CL | (2-3-3) | 3% |
| 5-HHB—CL | (2-3-3) | 3% |
| V—HH-3 | (3-1) | 20% |
| 1V—HH-3 | (3-2) | 10% |
| 3-HB—CL | (-) | 14% |

NI=87.7° C.; Tc≦−20° C.; Δn=0.135; Δ∈=4.2; γ1=40.0 mPa·s; Vth=2.09 V; VHR-1=98.1%; VHR-2=97.9%; τ=4.6 ms.

Example 15

| | | |
|---|---|---|
| 2-PyB(F)B(F,F)—F | (1-1) | 5% |
| 3-PyB(F)B(F,F)—F | (1-1) | 5% |
| 3-PyBB—F | (1-4) | 5% |
| 4-PyBB—F | (1-4) | 5% |
| 5-PyBB—F | (1-4) | 5% |
| 2-BB(F)B-3 | (2-1-1) | 10% |
| 2-BBB(2F)-5 | (2-1-2) | 5% |
| V2-HBB-2 | (2-2-1) | 10% |
| 2-HBB—F | (2-2-2) | 6% |
| 3-HBB—F | (2-2-2) | 6% |
| 5-HBB—F | (2-2-2) | 6% |
| V—HH-3 | (3-1) | 25% |
| 1V—HH-3 | (3-2) | 7% |

NI=100.9° C.; Tc≦−10° C.; Δn=0.160; Δ∈=6.0; γ1=63.7 mPa·s; Vth=1.91 V; VHR-1=98.1%; VHR-2=97.9%; τ=6.8 ms.

Example 16

| | | |
|---|---|---|
| 2-PyB(F)B(F,F)—F | (1-1) | 5% |
| 3-PyB(F)B(F,F)—F | (1-1) | 5% |
| 5-PyB(F)B(F,F)—F | (1-1) | 5% |
| 3-PyBB—F | (1-4) | 7% |
| 4-PyBB—F | (1-4) | 7% |
| 3-PyBB—CL | (1-14) | 7% |
| 2-BB(F)B-3 | (2-1-1) | 12% |
| 3-HBB-2 | (2-2-1) | 5% |
| 5-HBB-2 | (2-2-1) | 5% |
| V2-HBB-2 | (2-2-1) | 5% |
| 2-HBB—F | (2-2-2) | 5% |
| 3-HBB—F | (2-2-2) | 5% |
| V—HH-3 | (3-1) | 27% |

NI=102.8° C.; Tc≦−10° C.; Δn=0.170; Δ∈=8.4; γ1=84.9 mPa·s; Vth=1.69 V; VHR-1=98.2%; VHR-2=97.5%; τ=8.4 ms.

Example 17

| | | |
|---|---|---|
| 2-PyB(F)B(F,F)—F | (1-1) | 6% |
| 3-PyB(F)B(F,F)—F | (1-1) | 6% |
| 5-PyB(F)B(F,F)—F | (1-1) | 6% |
| 3-PyBB—F | (1-4) | 6% |
| 4-PyBB—F | (1-4) | 6% |
| 5-PyBB—F | (1-4) | 6% |
| 2-BB(F)B-3 | (2-1-1) | 10% |
| V—HHB-1 | (2-3-1) | 10% |
| V2-HHB-1 | (2-3-1) | 5% |
| V—HH-3 | (3-1) | 18% |
| 3-HB—CL | (-) | 5% |
| 5-HBB(F)B-2 | (-) | 5% |
| 5-HBB(F)B-3 | (-) | 5% |
| 3-HHB(F,F)—F | (-) | 6% |

NI=99.5° C.; Tc≦−10° C.; Δn=0.169; Δ∈=9.9; γ1=112.8 mPa·s; Vth=1.57 V; VHR-1=98.2%; VHR-2=97.6%; τ=10.8 ms.

Example 18

| Compound | Formula | % |
|---|---|---|
| 2-PyB(F)B(F,F)—F | (1-1) | 5% |
| 3-PyB(F)B(F,F)—F | (1-1) | 5% |
| 5-PyB(F)B(F,F)—F | (1-1) | 5% |
| 3-PyBB—F | (1-4) | 3% |
| 4-PyBB—F | (1-4) | 3% |
| 5-PyBB—F | (1-4) | 3% |
| 3-HBB-2 | (2-2-1) | 5% |
| V2-HBB-2 | (2-2-1) | 5% |
| 2-HBB—F | (2-2-2) | 5% |
| 3-HBB—F | (2-2-2) | 5% |
| V—HHB-1 | (2-3-1) | 10% |
| V2-HHB-1 | (2-3-1) | 6% |
| 3-HHB—CL | (2-3-3) | 5% |
| V—HH-3 | (3-1) | 22% |
| V—HH-4 | (3-1) | 4% |
| V—HH-5 | (3-1) | 4% |
| 7-HB-1 | (-) | 5% |

NI=94.8° C.; Tc≦−10° C.; Δn=0.139; Δ∈=6.2; γ1=65.6 mPa·s; Vth=1.86 V; VHR-1=98.2%; VHR-2=97.6%; τ=7.0 ms.

Example 19

| Compound | Formula | % |
|---|---|---|
| 2-PyB(F)B(F,F)—F | (1-1) | 5% |
| 3-PyB(F)B(F,F)—F | (1-1) | 5% |
| 5-PyB(F)B(F,F)—F | (1-1) | 5% |
| 3-PyBB—F | (1-4) | 4% |
| 4-PyBB—F | (1-4) | 4% |
| 5-PyBB—F | (1-4) | 4% |
| 2-BB(F)B-3 | (2-1-1) | 8% |
| 3-HBB-2 | (2-2-1) | 5% |
| V2-HBB-2 | (2-2-1) | 10% |
| 2-HBB—F | (2-2-2) | 3% |
| 3-HBB—F | (2-2-2) | 3% |
| 5-HBB—F | (2-2-2) | 3% |
| 3-HHB-1 | (2-3-1) | 5% |
| V—HHB-1 | (2-3-1) | 10% |
| V2-HHB-1 | (2-3-1) | 5% |
| V—HH-3 | (3-1) | 15% |
| 3-HB—CL | (-) | 6% |

NI=104.9° C.; Tc≦−10° C.; Δn=0.167; Δ∈=7.7; γ1=91.1 mPa·s; Vth=1.76 V; VHR-1=98.4%; VHR-2=97.7%; τ=9.2 ms.

Example 20

| Compound | Formula | % |
|---|---|---|
| 3-PyBB(F)—F | (1-3) | 7% |
| 4-PyBB(F)—F | (1-3) | 7% |
| 5-PyBB(F)—F | (1-3) | 6% |
| 2-BB(F)B-3 | (2-1-1) | 5% |
| 3-BB(F)B-5 | (2-1-1) | 5% |
| 3-HBB-2 | (2-2-1) | 4% |
| 5-HBB-2 | (2-2-1) | 4% |
| V2-HBB-2 | (2-2-1) | 10% |
| V—HH-3 | (3-1) | 30% |
| V—HH-5 | (3-1) | 5% |
| 3-HB—CL | (-) | 10% |
| 5-HB—CL | (-) | 7% |

NI=82.5° C.; Tc≦−20° C.; Δn=0.140; Δ∈=4.1; γ1=38.0 mPa·s; Vth=2.06 V; VHR-1=98.0%; VHR-2=97.8%; τ=4.0 ms.

Example 21

| Compound | Formula | % |
|---|---|---|
| 3-PyBB(F)—F | (1-3) | 5% |
| 4-PyBB(F)—F | (1-3) | 5% |
| 5-PyBB(F)—F | (1-3) | 4% |
| 2-BB(F)B-3 | (2-1-1) | 10% |
| 3-HBB-2 | (2-2-1) | 8% |
| 2-HBB—F | (2-2-2) | 6% |
| 3-HBB—F | (2-2-2) | 6% |
| 5-HBB—F | (2-2-2) | 6% |
| V—HH-3 | (3-1) | 25% |
| V—HH-4 | (3-1) | 5% |
| V—HH-5 | (3-1) | 5% |
| 1V—HH-3 | (3-1) | 5% |
| 7-HB-1 | (-) | 5% |
| 3-HB—CL | (-) | 5% |

NI=85.4° C.; Tc≦−20° C.; Δn=0.130; Δ∈=3.0; γ1=34.0 mPa·s; Vth=2.37 V; VHR-1=98.5%; VHR-2=98.0%; τ=4.1 ms.

Example 22

| Compound | Formula | % |
|---|---|---|
| 3-PyBB(F)—F | (1-3) | 8% |
| 4-PyBB(F)—F | (1-3) | 8% |
| 5-PyBB(F)—F | (1-3) | 8% |
| 2-BB(F)B-3 | (2-1-1) | 10% |
| 2-BBB(2F)-5 | (2-1-2) | 5% |
| 2-HHB-1 | (2-3-1) | 5% |
| 3-HHB-1 | (2-3-1) | 10% |
| V—HHB-1 | (2-3-1) | 10% |
| 3-HHB—F | (2-3-2) | 5% |
| V—HH-3 | (3-1) | 25% |
| 1V—HH-3 | (3-1) | 6% |

NI=112.5° C.; Tc≦−10° C.; Δn=0.151; Δ∈=4.7; γ1=72.0 mPa·s; Vth=2.16 V; VHR-1=98.0%; VHR-2=97.5%; τ=8.3 ms.

Example 23

| Compound | Formula | % |
|---|---|---|
| 3-PyBB(F)—F | (1-3) | 6% |
| 4-PyBB(F)—F | (1-3) | 5% |
| 5-PyBB(F)—F | (1-3) | 5% |
| V2-HBB-2 | (2-2-1) | 10% |
| 2-HBB—F | (2-2-2) | 4% |
| 3-HBB—F | (2-2-2) | 4% |
| 5-HBB—F | (2-2-2) | 4% |
| V—HHB-1 | (2-3-1) | 10% |
| 2-HHB—CL | (2-3-3) | 5% |
| 3-HHB—CL | (2-3-3) | 5% |
| 5-HHB—CL | (2-3-3) | 5% |
| V—HH-3 | (3-1) | 25% |
| 3-HB—CL | (-) | 12% |

NI=101.2° C.; Tc≦−20° C.; Δn=0.135; Δ∈=4.0; γ1=53.8 mPa·s; Vth=2.20 V; VHR-1=98.2%; VHR-2=97.6%; τ=6.6 ms.

Example 24

| | | |
|---|---|---|
| 3-PyBB(F)—F | (1-3) | 6% |
| 4-PyBB(F)—F | (1-3) | 5% |
| 5-PyBB(F)—F | (1-3) | 5% |
| 3-PyBB—F | (1-4) | 6% |
| 4-PyBB—F | (1-4) | 6% |
| 5-PyBB—F | (1-4) | 6% |
| 2-BB(F)B-3 | (2-1-1) | 7% |
| 2-BBB(2F)-3 | (2-1-2) | 5% |
| V2-HBB-2 | (2-2-1) | 6% |
| 2-HBB—F | (2-2-2) | 3% |
| 3-HBB—F | (2-2-2) | 3% |
| 5-HBB—F | (2-2-2) | 3% |
| V—HH-3 | (3-1) | 29% |
| V—HH-5 | (3-1) | 3% |
| 7-HB-1 | (-) | 7% |

NI=97.9° C.; Tc≦−10° C.; Δn=0.161; Δ∈=5.5; γ1=65.6 mPa·s; Vth=1.97 V; VHR-1=98.0%; VHR-2=97.4%; τ=7.3 ms.

Example 25

| | | |
|---|---|---|
| 3-PyBB(F)—F | (1-3) | 5% |
| 5-PyBB(F)—F | (1-3) | 5% |
| 3-PyBB—F | (1-4) | 3% |
| 4-PyBB—F | (1-4) | 3% |
| 5-PyBB—F | (1-4) | 3% |
| 2-BB(F)B-3 | (2-1-1) | 10% |
| 2-HHB-1 | (2-3-1) | 5% |
| 3-HHB-1 | (2-3-1) | 8% |
| V—HHB-1 | (2-3-1) | 10% |
| V2-HHB-1 | (2-3-1) | 5% |
| V—HH-3 | (3-1) | 25% |
| V—HH-4 | (3-1) | 8% |
| V1-HH-3 | (3-1) | 5% |
| 3-HB—CL | (-) | 5% |

NI=99.7° C.; Tc≦−20° C.; Δn=0.135; Δ∈=3.0; γ1=42.0 mPa·s; Vth=2.42 V; VHR-1=98.1%; VHR-2=97.5%; τ=5.8 ms.

Example 26

| | | |
|---|---|---|
| 3-PyBB(F)—F | (1-3) | 7% |
| 5-PyBB(F)—F | (1-3) | 6% |
| 3-PyBB—F | (1-4) | 5% |
| 4-PyBB—F | (1-4) | 5% |
| 5-PyBB—F | (1-4) | 5% |
| V2-HBB-2 | (2-2-1) | 10% |
| 2-HBB—F | (2-2-2) | 5% |
| 3-HBB—F | (2-2-2) | 5% |
| V—HHB-1 | (2-3-1) | 10% |
| 2-HHB—CL | (2-3-3) | 3% |
| 3-HHB—CL | (2-3-3) | 3% |
| V—HH-3 | (3-1) | 28% |
| V1-HH-3 | (3-1) | 3% |
| 5-HB-1 | (-) | 5% |

NI=108.0° C.; Tc≦−10° C.; Δn=0.145; Δ∈=4.6; γ1=59.5 mPa·s; Vth=2.41 V; VHR-1=98.0%; VHR-2=97.5%; τ=6.9 ms.

Example 27

| | | |
|---|---|---|
| 3-PyBB—F | (1-4) | 7% |
| 4-PyBB—F | (1-4) | 7% |
| 5-PyBB—F | (1-4) | 7% |
| 2-BB(F)B-3 | (2-1-1) | 10% |
| 2-BBB(2F)-5 | (2-1-2) | 5% |
| 2-HBB—F | (2-2-2) | 5% |
| 3-HBB—F | (2-2-2) | 5% |
| 5-HBB—F | (2-2-2) | 5% |
| V—HH-3 | (3-1) | 28% |
| 7-HB-1 | (-) | 10% |
| 3-HB—CL | (-) | 6% |
| 5-HB—CL | (-) | 5% |

NI=81.5° C.; Tc≦−10° C.; Δn=0.144; Δ∈=3.4; γ1=37.0 mPa·s; Vth=2.20 V; VHR-1=98.2%; VHR-2=97.5%; τ=4.3 ms.

Example 28

| | | |
|---|---|---|
| 3-PyBB—F | (1-4) | 5% |
| 4-PyBB—F | (1-4) | 5% |
| 5-PyBB—F | (1-4) | 5% |
| 2-BB(F)B-3 | (2-1-1) | 5% |
| 2-BB(F)B-5 | (2-1-1) | 5% |
| 3-BB(F)B-5 | (2-1-1) | 5% |
| 2-HHB-1 | (2-3-1) | 5% |
| 3-HHB-1 | (2-3-1) | 5% |
| V—HHB-1 | (2-3-1) | 5% |
| V—HH-3 | (3-1) | 25% |
| 1V—HH-3 | (3-2) | 10% |
| 7-HB-1 | (-) | 10% |
| 3-HB—CL | (-) | 5% |
| 5-HB—CL | (-) | 5% |

NI=86.2° C.; Tc≦−20° C.; Δn=0.126; Δ∈=2.6; γ1=30.0 mPa·s; Vth=2.64 V; VHR-1=98.6%; VHR-2=97.9%; τ=3.3 ms.

Example 29

| | | |
|---|---|---|
| 3-PyBB—F | (1-4) | 8% |
| 4-PyBB—F | (1-4) | 7% |
| 5-PyBB—F | (1-4) | 7% |
| V2-HBB-2 | (2-2-1) | 5% |
| 1V2-HBB-2 | (2-2-1) | 5% |
| V—HHB-1 | (2-3-1) | 10% |
| 2-HHB—CL | (2-3-3) | 5% |
| 3-HHB—CL | (2-3-3) | 5% |
| V—HH-3 | (3-1) | 30% |
| VFF—HHB-1 | (-) | 5% |
| 3-HB—CL | (-) | 10% |
| 5-HB—CL | (-) | 3% |

NI=105.0° C.; Tc≦−10° C.; Δn=0.136; Δ∈=3.5; γ1=43.0 mPa·s; Vth=2.33 V; VHR-1=98.2%; VHR-2=97.7%; τ=5.7 ms.

Example 30

| | | |
|---|---|---|
| 3-PyBB—F | (1-4) | 8% |
| 4-PyBB—F | (1-4) | 8% |
| 5-PyBB—F | (1-4) | 8% |
| 2-BB(F)B-3 | (2-1-1) | 10% |
| V2-HBB-2 | (2-2-1) | 10% |
| 3-HBB—F | (2-2-2) | 5% |
| V—HHB-1 | (2-3-1) | 10% |
| V2-HHB-1 | (2-3-1) | 5% |
| V—HH-3 | (31-) | 30% |
| 7-HB-1 | (-) | 6% |

NI=106.0° C.; Tc≦−10° C.; Δn=0.156; Δ∈=3.5; γ1=48.0 mPa·s; Vth=2.34 V; VHR-1=98.3%; VHR-2=97.7%; τ=6.2 ms.

Example 31

| | | |
|---|---|---|
| 2-PyB(F)B(F,F)—F | (1-1) | 4% |
| 3-PyB(F)B(F,F)—F | (1-1) | 4% |
| 4-PyB(F)B(F,F)—F | (1-1) | 4% |
| 2-BB(F)B-3 | (2-1-1) | 10% |
| 2-BB(F)B-5 | (2-1-1) | 5% |
| 3-BB(F)B-5 | (2-1-1) | 5% |
| 2-HBB—F | (2-2-2) | 7% |
| 3-HBB—F | (2-2-2) | 7% |
| 5-HBB—F | (2-2-2) | 7% |
| V—HH-3 | (3-1) | 20% |
| 1V—HH-3 | (3-2) | 4% |
| 2-BB(F,F)XB(F,F)—F | (4-1-1) | 3% |
| 3-BB(F,F)XB(F,F)—F | (4-1-1) | 9% |
| 5-BB(F,F)XB(F,F)—F | (4-1-1) | 6% |
| 5-HBB(F)B-2 | (-) | 5% |

NI=80.9° C.; Tc≦−20° C.; Δn=0.155; Δ∈=9.4; γ1=91.9 mPa·s; Vth=1.51 V; VHR-1=97.9%; VHR-2=97.5%; τ=8.9 ms.

Example 32

| | | |
|---|---|---|
| 2-PyB(F)B(F,F)—F | (1-1) | 3% |
| 3-PyB(F)B(F,F)—F | (1-1) | 4% |
| 4-PyB(F)B(F,F)—F | (1-1) | 3% |
| 2-BB(F)B-3 | (2-1-1) | 10% |
| 2-HBB—F | (2-2-2) | 3% |
| 3-HBB—F | (2-2-2) | 3% |
| 5-HBB—F | (2-2-2) | 3% |
| V—HHB-1 | (2-3-1) | 12% |
| V2-HHB-1 | (2-3-1) | 10% |
| V—HH-3 | (3-1) | 20% |
| 3-BB(F,F)XB(F,F)—F | (4-1-1) | 14% |
| 3-BB(F,F)XB(F)—OCF3 | (4-1-4) | 5% |
| 5-BB(F,F)XB(F)—OCF3 | (4-1-4) | 5% |
| 5-HBB(F)B-2 | (-) | 5% |

NI=74.5° C.; Tc≦−20° C.; Δn=0.153; Δ∈=9.6; γ1=99.9 mPa·s; Vth=1.48 V; VHR-1=98.0%; VHR-2=97.5%; τ=9.6 ms.

Example 33

| | | |
|---|---|---|
| 2-PyB(F)B(F,F)—F | (1-1) | 3% |
| 3-PyB(F)B(F,F)—F | (1-1) | 3% |
| 4-PyB(F)B(F,F)—F | (1-1) | 3% |
| 3-PyBB—F | (1-4) | 5% |
| 4-PyBB—F | (1-4) | 5% |
| 5-PyBB—F | (1-4) | 5% |
| 2-BB(F)B-3 | (2-1-1) | 8% |
| 2-HHB-1 | (2-3-1) | 5% |
| 3-HHB-1 | (2-3-1) | 10% |
| V—HHB-1 | (2-3-1) | 8% |
| V2-HHB-1 | (2-3-1) | 5% |
| V—HH-3 | (3-1) | 10% |
| 1V—HH-3 | (3-2) | 10% |
| 3-BB(F,F)XB(F,F)—F | (4-1-1) | 10% |
| 3-BB(F,F)XB(F,F)—OCF3 | (4-1-3) | 10% |

NI=93.0° C.; Tc≦−10° C.; Δn=0.153; Δ∈=10.4; γ1=108.5 mPa·s; Vth 1.51 V; VHR-1=98.1%; VHR-2=97.6%; τ=10.4 ms.

Example 34

| | | |
|---|---|---|
| 2-PyB(F)B(F,F)—F | (1-1) | 3% |
| 3-PyB(F)B(F,F)—F | (1-1) | 3% |
| V2-PyB(F)B(F,F)—F | (1-1) | 3% |
| 3-PyBB—F | (1-4) | 4% |
| 4-PyBB—F | (1-4) | 4% |
| 5-PyBB—F | (1-4) | 4% |
| V2-HBB-2 | (2-2-1) | 10% |
| V—HHB-1 | (2-3-1) | 10% |
| 2-HHB—CL | (2-3-3) | 5% |
| 3-HHB—CL | (2-3-3) | 5% |
| 5-HHB—CL | (2-3-3) | 5% |
| V—HH-3 | (3-1) | 20% |
| 1V—HH-3 | (3-2) | 9% |
| 3-BB(F,F)XB(F,F)—F | (4-1-1) | 5% |
| 3-BB(F,F)XB(F)—F | (4-1-2) | 5% |
| 3-BB(F,F)XB(F,F)—OCF3 | (4-1-3) | 5% |

NI=99.0° C.; Tc≦−10° C.; Δn=0.137; Δ∈=8.5; γ1=78.0 mPa·s; Vth=1.67 V; VHR-1=98.3%; VHR-2=97.7%; τ=7.8 ms.

Example 35

| | | |
|---|---|---|
| 2-PyBB(F,F)—F | (1-2) | 3% |
| 3-PyBB(F,F)—F | (1-2) | 3% |
| 4-PyBB(F,F)—F | (1-2) | 3% |
| 2-BB(F)B-3 | (2-1-1) | 10% |
| V2-HBB-2 | (2-2-1) | 10% |
| 2-HBB—F | (2-2-2) | 5% |
| 3-HBB—F | (2-2-2) | 5% |
| 5-HBB—F | (2-2-2) | 5% |
| 2-HHB-1 | (2-3-1) | 5% |
| V—HHB-1 | (2-3-1) | 10% |
| V—HH-3 | (3-1) | 28% |
| V—HH-4 | (3-1) | 4% |
| 3-HB—CL | (-) | 9% |

NI=92.0° C.; Tc≦−10° C.; Δn=0.128; Δ∈=3.0; γ1=30.6 mPa·s; Vth=2.41 V; VHR-1=98.4%; VHR-2=97.9%; τ=4.1 ms.

Example 36

| | | |
|---|---|---|
| 2-PyBB(F,F)—F | (1-2) | 3% |
| 3-PyBB(F,F)—F | (1-2) | 3% |
| 4-PyBB(F,F)—F | (1-2) | 3% |
| 3-PyBB—F | (1-4) | 3% |
| 4-PyBB—F | (1-4) | 3% |
| 5-PyBB—F | (1-4) | 3% |
| 2-BB(F)B-3 | (2-1-1) | 5% |
| 2-BBB(2F)-5 | (2-1-2) | 5% |
| 5-BBB(2F)-2 | (2-1-2) | 5% |
| 3-HBB-2 | (2-2-1) | 5% |
| V—HHB-1 | (2-3-1) | 10% |
| 3-HHB—F | (2-3-2) | 5% |
| V—HH-3 | (3-1) | 27% |
| 3-BB(F,F)XB(F,F)—F | (4-1-1) | 10% |
| 3-BB(F,F)XB(F,F)—OCF3 | (4-1-3) | 10% |

NI=86.3° C.; Tc≦−10° C.; Δn=0.147; Δ∈=8.9; γ1=83.1 mPa·s; Vth=1.58 V; VHR-1=98.1%; VHR-2=97.6%; τ=8.1 ms.

Example 37

| | | |
|---|---|---|
| 2-PyB(F)B(F,F)—OCF3 | (1-7) | 5% |
| 3-PyB(F)B(F,F)—OCF3 | (1-7) | 5% |
| 4-PyB(F)B(F,F)—OCF3 | (1-7) | 5% |
| 3-PyB(F,F)B(F)—OCF3 | (1-11) | 5% |
| 2-BB(F)B-3 | (2-1-1) | 10% |
| V2-HBB-2 | (2-2-1) | 5% |
| 2-HBB—F | (2-2-2) | 5% |
| 3-HBB—F | (2-2-2) | 5% |
| 5-HBB—F | (2-2-2) | 5% |
| V—HHB-1 | (2-3-1) | 10% |
| V—HH-3 | (3-1) | 10% |
| 3-BB(F,F)XB(F,F)—F | (4-1-1) | 20% |
| 3-BB(F,F)XB(F,F)—OCF3 | (4-1-3) | 5% |
| 3-HHBB(F,F)—F | (-) | 5% |

NI=80.5° C.; Tc≦−20° C.; Δn=0.157; Δ∈=14.8; γ1=135.0 mPa·s; Vth=1.25 V; VHR-1=97.9%; VHR-2=97.6%; τ=12.2 ms.

Example 38

| | | |
|---|---|---|
| 3-PyBB(F)—F | (1-3) | 5% |
| 5-PyBB(F)—F | (1-3) | 5% |
| 3-PyBB—F | (1-4) | 5% |
| 4-PyBB—F | (1-4) | 5% |
| 5-PyBB—F | (1-4) | 5% |
| 2-BB(F)B-3 | (2-1-1) | 5% |
| 2-BB(F)B-5 | (2-1-1) | 5% |
| V—HHB-1 | (2-3-1) | 10% |
| V2-HHB-1 | (2-3-1) | 10% |
| V—HH-3 | (3-1) | 20% |
| 3-BB(F,F)XB(F,F)—F | (4-1-1) | 10% |
| 3-BB(F,F)XB(F)—OCF3 | (4-1-4) | 10% |
| 3-HB—CL | (-) | 5% |

NI=82.9° C.; Tc≦−20° C.; Δn=0.163; Δ∈=9.0; γ1=97.3 mPa·s; Vth=1.55 V; VHR-1=98.2%; VHR-2=97.6%; τ=9.5 ms.

Example 39

| | | |
|---|---|---|
| 3-PyBB(F)—F | (1-3) | 6% |
| 5-PyBB(F)—F | (1-3) | 6% |
| 3-PyBB—F | (1-4) | 4% |
| 4-PyBB—F | (1-4) | 4% |
| 5-PyBB—F | (1-4) | 4% |
| V—HHB-1 | (2-3-1) | 10% |
| 2-HHB—CL | (2-3-3) | 5% |
| 3-HHB—CL | (2-3-3) | 5% |
| 5-HHB—CL | (2-3-3) | 5% |
| V—HH-3 | (3-1) | 10% |
| 3-BB(F,F)XB(F,F)—F | (4-1-1) | 10% |
| 3-BB(F,F)XB(F,F)—OCF3 | (4-1-3) | 5% |
| 3-BB(F,F)XB(F)—OCF3 | (4-1-4) | 10% |
| 3-HB—CL | (-) | 5% |
| 2-HBB(F,F)—F | (-) | 5% |
| 3-HBB(F,F)—F | (-) | 6% |

NI=85.3° C.; Tc≦−20° C.; Δn=0.150; Δ∈=11.6; γ1=127.0 mPa·s; Vth=1.41 V; VHR-1=98.3%; VHR-2=97.7%; τ=11.8 ms.

Example 40

| | | |
|---|---|---|
| 3-PyBB—F | (1-4) | 4% |
| 4-PyBB—F | (1-4) | 4% |
| 5-PyBB—F | (1-4) | 4% |
| 2-BB(F)B-3 | (2-1-1) | 6% |
| 2-BB(F)B-5 | (2-1-1) | 5% |
| V—HHB-1 | (2-3-1) | 10% |
| V2-HHB-1 | (2-3-1) | 5% |
| V—HH-3 | (3-1) | 28% |
| 1V—HH-3 | (3-2) | 7% |
| 3-BB(F,F)XB(F,F)—F | (4-1-1) | 10% |
| 3-BB(F,F)XB(F,F)—OCF3 | (4-1-3) | 5% |
| 3-HB—CL | (-) | 5% |
| 2-BB(2F,5F)B-3 | (-) | 4% |
| 3-BB(2F,5F)B-3 | (-) | 3% |

NI=78.9° C.; Tc≦−20° C.; Δn=0.140; Δ∈=5.5; γ1=52.7 mPa·s; Vth=1.84 V; VHR-1=98.2%; VHR-2=97.8%; τ=5.8 ms.

Example 41

| | | |
|---|---|---|
| 3-PyBB—F | (1-4) | 6% |
| 5-PyBB—F | (1-4) | 6% |
| 2-BB(F)B-3 | (2-1-1) | 8% |
| 2-BB(F)B-5 | (2-1-1) | 3% |
| 2-HBB—F | (2-2-2) | 6% |
| 3-HBB—F | (2-2-2) | 6% |
| 5-HBB—F | (2-2-2) | 4% |
| 3-HHB—CL | (2-3-3) | 7% |
| V—HH-3 | (3-1) | 31% |
| 3-BB(F,F)XB(F,F)—F | (4-1-1) | 14% |
| 3-HB—CL | (-) | 9% |

NI=76.2° C.; Tc≦−20° C.; Δn=0.131; Δ∈=5.0; γ1=51.0 mPa·s; Vth=1.80 V; VHR-1=98.5%; VHR-2=97.8%; τ=4.9 ms.

Example 42

| | | |
|---|---|---|
| 2-PyB(F)B(F,F)—F | (1-1) | 3% |
| 3-PyB(F)B(F,F)—F | (1-1) | 3% |
| 4-PyB(F)B(F,F)—F | (1-1) | 3% |
| 3-PyBB—F | (1-4) | 3% |
| 4-PyBB—F | (1-4) | 3% |
| 5-PyBB—F | (1-4) | 3% |
| 2-BB(F)B-3 | (2-1-1) | 10% |
| 2-HBB—F | (2-2-2) | 5% |
| 3-HBB—F | (2-2-2) | 5% |
| 5-HBB—F | (2-2-2) | 5% |
| V—HHB-1 | (2-3-1) | 10% |
| V—HH-3 | (3-1) | 30% |
| 2-BB(F)B(F,F)—F | (4-2-1) | 4% |
| 3-BB(F)B(F,F)—F | (4-2-1) | 4% |
| 4-BB(F)B(F,F)—F | (4-2-1) | 4% |
| 3-HB(F)B(F,F)—F | (4-2-2) | 5% |

NI=87.3° C.; Tc≦−20° C.; Δn=0.148; Δ∈=7.6; γ1=72.7 mPa·s; Vth=1.68 V; VHR-1=98.4%; VHR-2=97.7%; τ=7.3 ms.

Example 43

| | | |
|---|---|---|
| 3-PyBB(F)—F | (1-3) | 6% |
| 5-PyBB(F)—F | (1-3) | 6% |
| 3-PyBB—F | (1-4) | 4% |
| 4-PyBB—F | (1-4) | 4% |
| 5-PyBB—F | (1-4) | 4% |
| 2-BB(F)B-3 | (2-1-1) | 5% |
| 2-BB(F)B-5 | (2-1-1) | 5% |
| 2-HBB—F | (2-2-2) | 5% |
| 3-HBB—F | (2-2-2) | 5% |
| V—HHB-1 | (2-3-1) | 10% |
| V—HH-3 | (3-1) | 20% |
| 1V—HH-3 | (3-2) | 9% |
| 2-BB(F)B(F,F)—F | (4-2-1) | 4% |
| 3-BB(F)B(F,F)—F | (4-2-1) | 4% |
| 4-BB(F)B(F,F)—F | (4-2-1) | 4% |
| 3-HB(F)B(F,F)—F | (4-2-2) | 5% |

NI=97.0° C.; Tc≦−20° C.; Δn=0.160; Δ∈=7.3; γ1=84.0 mPa·s; Vth=1.76 V; VHR-1=98.0%; VHR-2=97.6%; τ=8.6 ms.

Example 44

| | | |
|---|---|---|
| 2-PyB(F)B(F,F)—OCF3 | (1-7) | 3% |
| 3-PyB(F)B(F,F)—OCF3 | (1-7) | 3% |
| 3-PyBB—F | (1-4) | 4% |
| 4-PyBB—F | (1-4) | 4% |
| 5-PyBB—F | (1-4) | 4% |
| 2-HHB—CL | (2-3-3) | 5% |
| 3-HHB—CL | (2-3-3) | 5% |
| 5-HHB—CL | (2-3-3) | 5% |
| V—HH-3 | (3-1) | 30% |
| 3-BB(F,F)XB(F,F)—F | (4-1-1) | 10% |
| 2-BB(F)B(F,F)—F | (4-2-1) | 5% |
| 3-BB(F)B(F,F)—F | (4-2-1) | 5% |
| 4-BB(F)B(F,F)—F | (4-2-1) | 5% |
| 3-HB(F)B(F,F)—F | (4-2-2) | 5% |
| 3-HBB(F)—F | (-) | 7% |

NI=76.0° C.; Tc≦−20° C.; Δn=0.137; Δ∈=10.0; γ1=89.9 mPa·s; Vth=1.44 V; VHR-1=98.1%; VHR-2=97.6%; τ=8.5 ms.

Example 45

| | | |
|---|---|---|
| 3-PyBB—F | (1-4) | 4% |
| 4-PyBB—F | (1-4) | 4% |
| 5-PyBB—F | (1-4) | 4% |
| 2-HBB—F | (2-2-2) | 5% |
| 3-HBB—F | (2-2-2) | 5% |
| 5-HBB—F | (2-2-2) | 5% |
| V—HH-3 | (3-1) | 24% |
| 3-BB(F,F)XB(F,F)—F | (4-1-1) | 10% |
| 3-BB(F,F)XB(F)—OCF3 | (4-1-4) | 5% |
| 3-BB(F)B(F,F)—F | (4-2-1) | 8% |
| 3-HB(F)B(F,F)—F | (4-2-2) | 8% |
| VFF—HH-3 | (-) | 5% |
| VFF—HH-5 | (-) | 5% |
| 5-HBB(2F)H-3 | (-) | 4% |
| 5-HBB(F)B-2 | (-) | 4% |

NI=79.2° C.; Tc≦−20° C.; Δn=0.134; Δ∈=8.1; γ1=78.0 mPa·s; Vth=1.59 V; VHR-1=98.0%; VHR-2=97.6%; τ=7.7 ms.

Example 46

The compound (5-1-1) was added in an amount of 0.1% to the following composition of Example 3, and VHR-3 was measured. Stability to ultraviolet light was increased by adding the compound (5-1-1).

| | | |
|---|---|---|
| 3-PyBB—F | (1-4) | 5% |
| 4-PyBB—F | (1-4) | 5% |
| 5-PyBB—F | (1-4) | 5% |
| 2-BB(F)B-3 | (2-1-1) | 5% |
| V—HHB-1 | (2-3-1) | 9% |
| 3-HHB—CL | (2-3-3) | 7% |
| V—HH-3 | (3-1) | 32% |
| 3-BB(F,F)XB(F,F)—OCF3 | (4-1-3) | 10% |
| 3-HB—CL | (-) | 14% |
| 3-HHB(F,F)—F | (-) | 5% |
| 3-HBB(F,F)—F | (-) | 3% |

NI=72.1° C.; Tc≦−10° C.; Δn=0.116; Δ∈=4.7; γ1=43.3 mPa·s; Vth=1.85 V; VHR-1=98.7%; VHR-2=98.1%; VHR-3=97.5%; τ=6.3 ms.

Example 47

The compound (5-2-3) was added in an amount of 0.1% to the following composition of Example 3, and VHR-3 was measured. Stability to ultraviolet light was increased by adding the compound (5-2-3).

| | | |
|---|---|---|
| 3-PyBB—F | (1-4) | 5% |
| 4-PyBB—F | (1-4) | 5% |
| 5-PyBB—F | (1-4) | 5% |
| 2-BB(F)B-3 | (2-1-1) | 5% |
| V—HHB-1 | (2-3-1) | 9% |
| 3-HHB—CL | (2-3-3) | 7% |
| V—HH-3 | (3-1) | 32% |
| 3-BB(F,F)XB(F,F)—OCF3 | (4-1-3) | 10% |
| 3-HB—CL | (-) | 14% |
| 3-HHB(F,F)—F | (-) | 5% |
| 3-HBB(F,F)—F | (-) | 3% |

NI=72.1° C.; Tc≦−10° C.; Δn=0.116; Δ∈=4.7; γ1=43.3 mPa·s; Vth=1.85 V; VHR-1=98.7%; VHR-2=98.1%; VHR-3=97.7%; τ=6.3 ms.

Example 48

The compound (5-1-1) was added in an amount of 0.1% to the following composition of Example 5, and VHR-3 was measured. Stability to ultraviolet light was increased by adding the compound (5-1-1).

| | | |
|---|---|---|
| 3-PyBB(F,F)—F | (1-2) | 6% |
| 5-PyBB(F,F)—F | (1-2) | 6% |
| 2-BB(F)B-3 | (2-1-1) | 9.5% |
| V—HHB-1 | (2-3-1) | 8.5% |
| 3-HHB—CL | (2-3-3) | 7% |
| V—HH-3 | (3-1) | 29% |
| 3-HB—CL | (-) | 14% |
| 3-HHB(F,F)—F | (-) | 5% |
| 3-HBB(F,F)—F | (-) | 15% |

NI=71.9° C.; Tc≦0° C.; Δn=0.114; Δ∈=4.7; γ1=46.9 mPa·s; Vth=1.89 V; VHR-1=98.0%; VHR-2=97.7%; VHR-3=97.4%; τ=7.1 ms.

Example 49

The compound (5-2-3) was added in an amount of 0.1% to the following composition of Example 5, and VHR-3 was measured. Stability to ultraviolet light was increased by adding the compound (5-2-3).

| | | |
|---|---|---|
| 3-PyBB(F,F)—F | (1-2) | 6% |
| 5-PyBB(F,F)—F | (1-2) | 6% |
| 2-BB(F)B-3 | (2-1-1) | 9.5% |
| V—HHB-1 | (2-3-1) | 8.5% |
| 3-HHB—CL | (2-3-3) | 7% |
| V—HH-3 | (3-1) | 29% |
| 3-HB—CL | (-) | 14% |
| 3-HHB(F,F)—F | (-) | 5% |
| 3-HBB(F,F)—F | (-) | 15% |

NI=71.9° C.; Tc≦0° C.; Δn=0.114; Δ∈=4.7; γ1=46.9 mPa·s; Vth=1.89 V; VHR-1=98.0%; VHR-2=97.7%; VHR-3=97.5%; τ=7.1 ms.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal composition having a nematic phase comprising first, second and third components, wherein the first component is at least one compound selected from the group of compounds represented by formula (1-1), and the second component is at least one compound selected from the group of compounds represented by formula (2-1) and at least one compound selected from the group of compounds represented by formula (2-3), and the third component is at least one compound selected from the group of compounds represented by formulas (3-1) and (3-2):

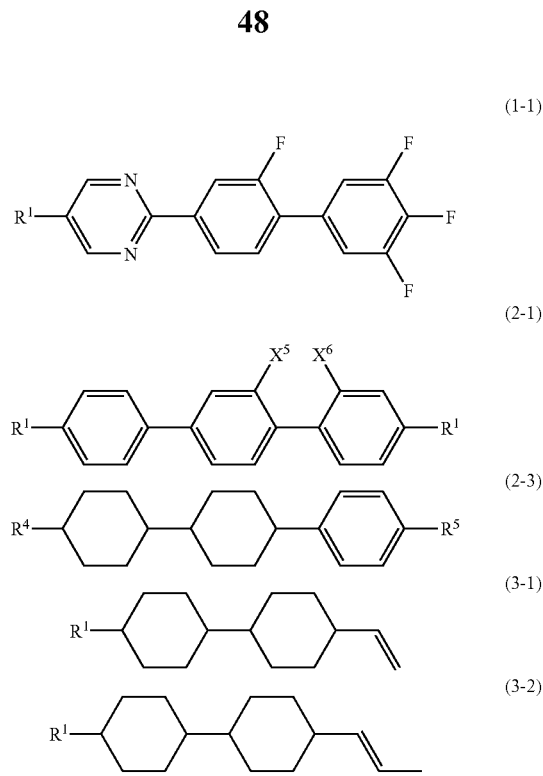

wherein $R^1$ is alkyl having 1 to 12 carbons; $R^4$ is alkyl having 1 to 12 carbons or alkenyl having 2 to 12 carbons; $R^5$ is fluorine, chlorine, alkyl having 1 to 12 carbons or alkenyl having 2 to 12 carbons; $X^5$ is fluorine; and $X^6$ is hydrogen.

2. A liquid crystal composition having a nematic phase comprising first, second and third components, wherein the first component is at least one compound selected from the group of compounds represented by formula (1-1) and at least one compound selected from the group of compounds represented by formula (1-4), and the second component is at least one compound selected from the group of compounds represented by formula (2-1) and at least one compound selected from the group of compounds represented by formula (2-3), and the third component is at least one compound selected from the group of compounds represented by formulas (3-1) and (3-2):

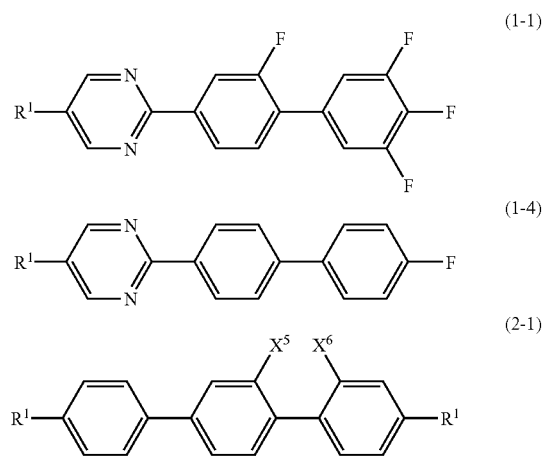

-continued

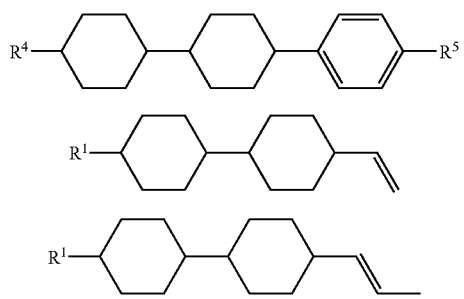

wherein R¹ is alkyl having 1 to 12 carbons; R⁴ is alkyl having 1 to 12 carbons or alkenyl having 2 to 12 carbons; R⁵ is fluorine, chlorine, alkyl having 1 to 12 carbons or alkenyl having 2 to 12 carbons; X⁵ is fluorine; and X⁶ is hydrogen.

3. A liquid crystal composition having a nematic phase comprising first, second and third components, wherein the first component is at least one compound selected from the group of compounds represented by formula (1-3), and the second component is at least one compound selected from the group of compounds represented by formula (2-1) and at least one compound selected from the group of compounds represented by formula (2-3), and the third component is at least one compound selected from the group of compounds represented by formulas (3-1) and (3-2):

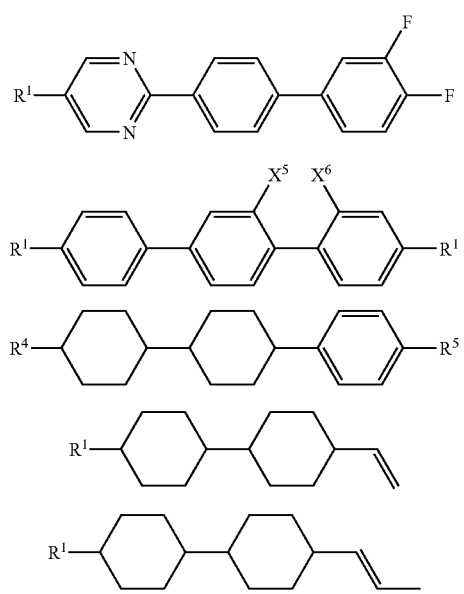

wherein R¹ is alkyl having 1 to 12 carbons; R⁴ is alkyl having 1 to 12 carbons or alkenyl having 2 to 12 carbons; R⁵ is fluorine, chlorine, alkyl having 1 to 12 carbons or alkenyl having 2 to 12 carbons; X⁵ is fluorine; and X⁶ is hydrogen.

4. A liquid crystal composition having a nematic phase composing first, second and third components, wherein the first component is at least one compound selected from the group of compounds represented by formula (1-3) and at least one compound selected from the group of compounds represented by formula (1-4), and the second component is at least one compound selected from the group of compounds represented by formula (2-1) and at least one compound selected from the group of compounds represented by formula (2-3), and the third component is at least one compound selected from the group of compounds represented by formulas (3-1) and (3-2):

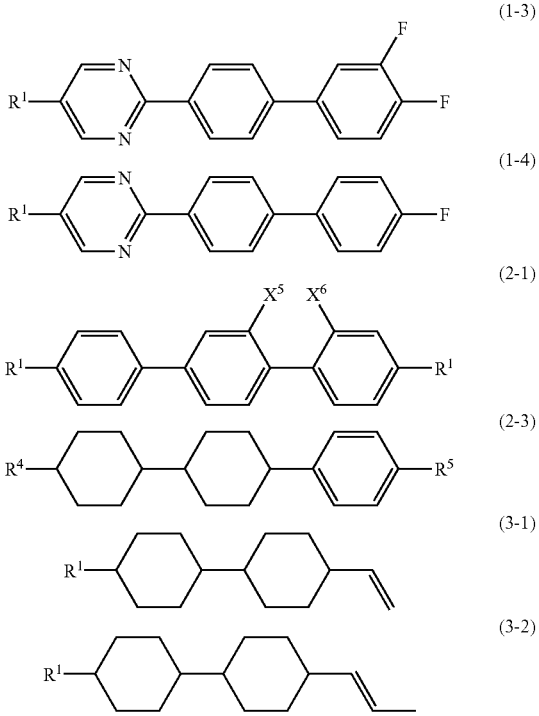

wherein R¹ is alkyl having 1 to 12 carbons; R⁴ is alkyl having 1 to 12 carbons or alkenyl having 2 to 12 carbons; R⁵ is fluorine, chlorine, alkyl having 1 to 12 carbons or alkenyl having 2 to 12 carbons; X⁵ is fluorine; and X⁶ is hydrogen.

5. A liquid crystal composition having a nematic phase composing first, second and third components, wherein the first component is at least one compound selected from the group of compounds represented by formula (1-4), and the second component is at least one compound selected from the group of compounds represented by formula (2-1) and at least one compound selected from the group of compounds represented by formula (2-3), and the third component is at least one compound selected from the group of compounds represented by formulas (3-1) and (3-2):

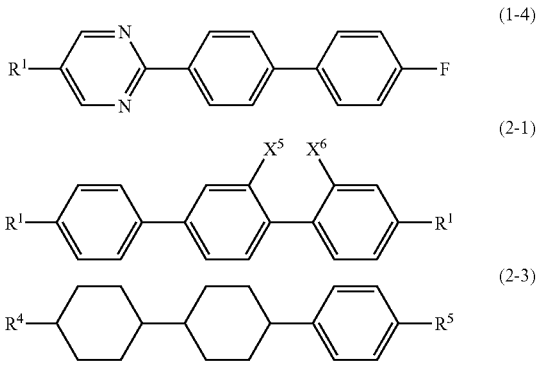

-continued

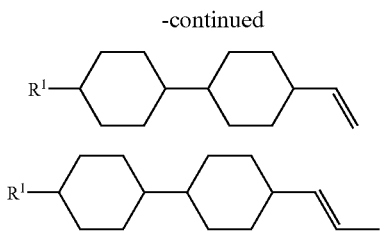
(3-1)

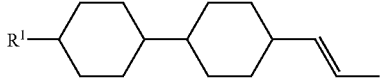
(3-2)

wherein $R^1$ is alkyl having 1 to 12 carbons; $R^4$ is alkyl having 1 to 12 carbons or alkenyl having 2 to 12 carbons; $R^5$ is fluorine, chlorine, alkyl having 1 to 12 carbons or alkenyl having 2 to 12 carbons; $X^5$ is fluorine; and $X^6$ is hydrogen.

6. A liquid crystal composition having a nematic phase comprising first, second and third components, wherein the first component is at least one compound selected from the group of compounds represented by formulas (1-1) to (1-4), the second component is at least one compound selected from the group of compounds represented by formulas (2-1) to (2-3), the third component is at least one compound selected from the group of compounds represented by formulas (3-1) and (3-2), and further comprises at least one compound selected from the group of compounds having a group represented by formulas (4-1) and (4-2) as a fourth component:

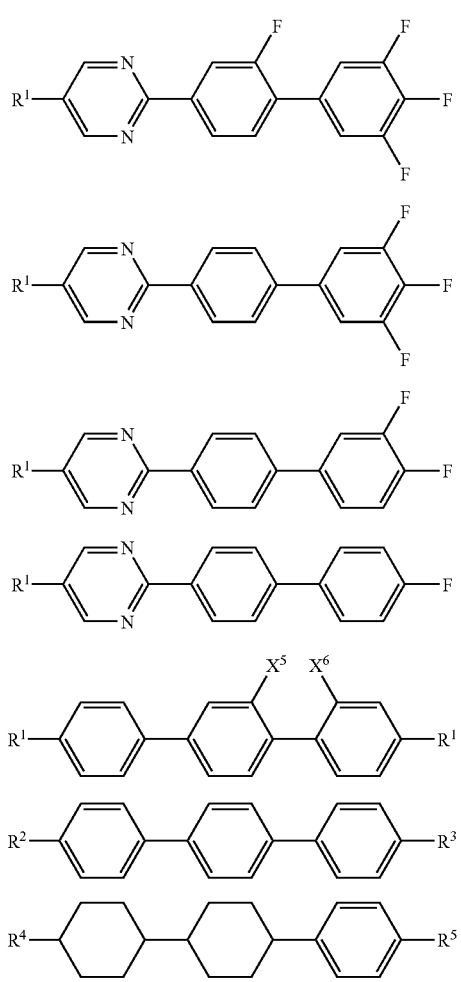

-continued

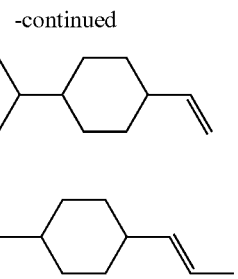
(3-1)

(3-2)

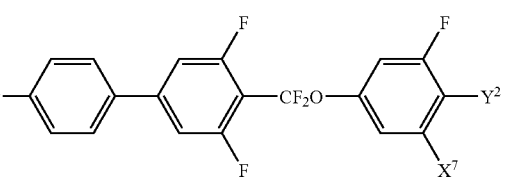
(4-1)

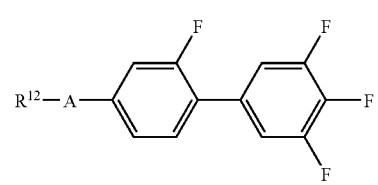
(4-2)

wherein $R^1$ and $R^2$ are alkyl having 1 to 12 carbons; $R^3$ fluorine $R^4$; is alkyl having 1 to 12 carbons or alkenyl having 2 to 12 carbons; $R^5$ is fluorine, chlorine, alkyl having 1 to 12 carbons or alkenyl having 2 to 12 carbons; $R^{12}$ is alkyl having 1 to 12 carbons or alkenyl having 2 to 12 carbons; $X^5$ is fluorine; $X^6$ is hydrogen; $X^7$ is hydrogen or fluorine; $Y^2$ is fluorine or trifluoromethoxy; and A is 1,4-cyclohexylene or 1,4-phenylene.

7. The liquid crystal composition according to claim 6, wherein the fourth component is at least one compound selected from the group of compounds represented by formula (4-1).

8. The liquid crystal composition according to claim 6, wherein the ratio of the first component is in a range of from approximately 5% to approximately 40% by weight, the ratio of the second component is in a range of from approximately 5% to approximately 60% by weight, the ratio of the third component is in a range of from approximately 10% to approximately 55% by weight, and the ratio of the fourth component is in a range of from approximately 10% to approximately 35% by weight, based on the total weight of the liquid crystal composition.

9. The liquid crystal composition according to claim 6, wherein the composition further comprises at least one compound selected from the group of compounds having a group represented by formulas (5-1) and (5-2) as a fifth component:

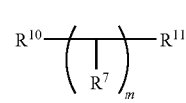
(5-1)

-continued

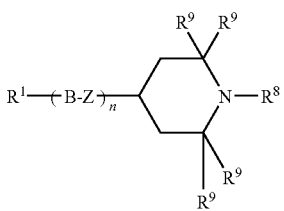
(5-2)

wherein $R^1$ is alkyl having 1 to 12 carbons or alkenyl having 2 to 12 carbons; $R^7$ is hydrogen or group D,

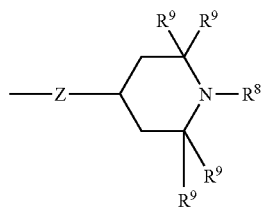
(D)

wherein at least one of $R^7$ is group D; $R^8$ is hydrogen, alkyl having 1 to 12 carbons or alkoxy having 1 to 12 carbons; $R^9$ is alkyl having 1 to 8 carbons; $R^{10}$ and $R^{11}$ are independently hydrogen or alkyl having 1 to 5 carbons; B is 1,4-cyclohexylene, 1,4-phenylene or 3-fluoro-1,4-phenylene; Z is a single bond, ethylene, carbonyloxy or oxycarbonyl; m is an integer of 1 to 20; and n is 1 or 2.

10. The liquid crystal composition according to claim 9, wherein the ratio of the first component is in a range of from approximately 5% to approximately 40% by weight, the ratio of the second component is in a range of from approximately 5% to approximately 60% by weight, the ratio of the third component is in a range of from approximately 10% to approximately 55% by weight, the ratio of the fourth component is in a range of from approximately 10% to approximately 35% by weight, and the ratio of the fifth component is in a range of from approximately 0.001% to approximately 5% by weight, based on the total weight of the liquid crystal composition.

11. A liquid crystal display device comprising the liquid crystal composition of claim 1.

12. A liquid crystal display device comprising the liquid crystal composition of claim 3.

13. A liquid crystal display device comprising the liquid crystal composition of claim 5.

14. A liquid crystal display device comprising the liquid crystal composition of claim 6.

* * * * *